United States Patent
Mukherjee et al.

(10) Patent No.: US 8,755,441 B2
(45) Date of Patent: *Jun. 17, 2014

(54) REGION OF INTEREST-BASED VIDEO TRANSFER

(75) Inventors: Uddipan Mukherjee, Irvine, CA (US); Don Hideyasu Matsubayashi, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

This patent is subject to a terminal disclaimer.

(21) Appl. No.: 12/777,187

(22) Filed: May 10, 2010

(65) Prior Publication Data

US 2011/0276652 A1 Nov. 10, 2011

(51) Int. Cl.
*H04N 7/12* (2006.01)

(52) U.S. Cl.
USPC ........ 375/240.2; 375/240; 709/217; 709/218; 709/219; 709/220; 709/222; 709/238; 709/239; 709/240

(58) Field of Classification Search
USPC ......... 709/201, 203, 217–222, 231–233, 236, 709/237, 238–241; 375/240, 240.2
See application file for complete search history.

(56) References Cited

U.S. PATENT DOCUMENTS

| | | | | |
|---|---|---|---|---|
| 5,946,043 | A | 8/1999 | Lee et al. | 348/420 |
| 5,991,816 | A | 11/1999 | Percival et al. | 709/247 |
| 6,256,423 | B1 | 7/2001 | Krishnamurthy et al. | 382/251 |
| 6,314,452 | B1 | 11/2001 | Dekel et al. | 709/203 |
| 6,496,607 | B1 | 12/2002 | Krishnamurthy et al. | 382/282 |
| 6,775,412 | B1 | 8/2004 | Nister et al. | 382/243 |
| 6,804,405 | B2 | 10/2004 | Christopoulos et al. | 382/243 |
| 6,909,745 | B1 | 6/2005 | Puri et al. | 375/240.01 |
| 7,206,456 | B2 | 4/2007 | Hannuksela et al. | 382/243 |
| 7,221,804 | B2 | 5/2007 | Atsumi et al. | 382/239 |
| 7,260,614 | B2 | 8/2007 | Deshpande et al. | 709/217 |
| 7,290,011 | B2 | 10/2007 | Eldar et al. | 707/104.1 |
| 7,571,382 | B2 | 8/2009 | Larsson et al. | 715/249 |
| 7,587,261 | B2 | 9/2009 | Hopkins | 700/259 |
| 2008/0107174 | A1* | 5/2008 | Roman | 375/240.02 |
| 2011/0013844 | A1* | 1/2011 | Yamada | 382/207 |
| 2011/0218864 | A1* | 9/2011 | Pentz et al. | 705/14.71 |

OTHER PUBLICATIONS

Liu et al., "Automatic Browsing of Large Pictures on Mobile Devices", Int'l Multimedia Conference, Proceedings on the Eleventh ACM International Conference on Multimedia, pp. 148-55 (2003).
Int'l Telecommunication Union, Recommendation T.81, Information Technology—Digital Compression and Coding of Continuous-tone Still Images—Requirements and Guidelines (1992).
Int'l Telecommunication Union, ITU-T Recommendation H.264, Advanced Video Coding for Generic Audiovisual Services (2005).

* cited by examiner

*Primary Examiner* — Phuoc Nguyen
*Assistant Examiner* — Clarence John
(74) *Attorney, Agent, or Firm* — Fitzpatrick, Cella, Harper & Scinto

(57) ABSTRACT

Image data for frames of a moving image is transmitted from a first computer to a second computer. A region of interest for all of the frames in the moving image is identified by calculations using the image data for at least some of the frames. Coordinates for the region of interest are transmitted. Image data for a first frame and second frame for the region of interest is encoded and transmitted. A region surrounding the region of interest is identified. Coordinates for the region surrounding the region of interest are transmitted. Image data for the first frame for the region surrounding the region of interest is encoded and transmitted, wherein transmission of the encoded image data for the first frame for the region surrounding the region of interest is effected after transmission of encoded image data for both of the first and second frames for the region of interest.

54 Claims, 8 Drawing Sheets

| 12 | 9 | 9 | 9 | 9 | 9 | 9 |
|----|---|---|---|---|---|----|
| 12 | 8 | 5 | 5 | 5 | 5 | 10 |
| 12 | 8 | 4 | 1 | 1 | 6 | 10 |
| 12 | 8 | 4 | ROI center | 2 | 6 | 10 |
| 12 | 8 | 3 | 3 | 2 | 6 | 10 |
| 12 | 7 | 7 | 7 | 7 | 6 | 10 |
| 11 | 11 | 11 | 11 | 11 | 11 | 10 |

FIG. 7

REGION OF INTEREST-BASED VIDEO TRANSFER

FIELD

The present disclosure relates to transmission of a moving image, and more specifically relates to transmission of moving image data over a network from a first computer to a second computer.

BACKGROUND

In the field of transmission of moving image data, image data is typically encoded before being transmitted over a network to a receiving computer. The encoding process is usually performed by dividing the moving image into frames, e.g., intracoded frames (I-frames) or intercoded frames (P- or B-frames), and processing each frame in a predesignated scanning order. Each encoded frame is transmitted to a receiving computer in the same predesignated scanning order, where the frame is further processed to recreate the moving image.

One method of encoding involves processing the moving image data in a raster scan order, where each frame is arranged and processed row by row. Another method involves processing the frames in a zigzag scan order, where processing begins from the top-left corner of the frame and proceeds in a zigzag pattern towards the bottom-right corner of the frame.

SUMMARY

One difficulty with such implementations may arise in bandwidth constrained networks, where a receiving computer may not be able to display visually significant features in a moving image until a substantial portion of the image data has been received. For example, frames transmitted using a raster order would be displayed sequentially, row by row, beginning with the upper portion of the frame. As a consequence, display of any visually significant features that happen to be located near the bottom of the frame would be postponed until transmission of those rows. This difficulty may be exacerbated in situations where the network transmission is terminated prematurely, where the display of a visually significant feature might be precluded entirely.

The display of visually significant features may also be affected by high latency resulting from encoding and transmitting each frame in its entirety. For example, frames in a moving image are typically processed so that all of the image data for a frame is encoded and transmitted in its entirety using a predesignated scanning order. As a consequence, a user may experience a lag between the time a computer receives and displays a first frame and the time a computer receives and displays a second frame subsequent in time to the first frame. In such situations, the continuous frame-by-frame display of the visually significant features may be impaired.

The foregoing situation is addressed herein by identifying a region or regions of interest for all of the multiple frames in the moving image using image data for at least some of the frames, and prioritizing the encoding and transmission of the identified regions of interest for an entirety of the moving image. The identified regions of interest might be encoded, for example, in an order starting from the center of the region of interest, spiraling outwardly toward its edges. Furthermore, the image data may be progressively encoded, from a coarser level to a finer level, where the progressive encoding results in an improvement in the visual quality of the moving image being displayed by the receiving computer. In addition, image data remaining in each frame, e.g., the non-regions of interest, is encoded and transmitted, frame by frame, for an entirety of the moving image.

As described herein, the region of interest is determined automatically based on calculations using the image data for at least some of the multiple frames, such as, for example, face detection calculations, edge detection calculations, and spatial frequency calculations. Moreover, the region of interest may be determined using machine learning techniques, data mining techniques, metadata retrieval from the image data, and block recognition techniques.

Thus, in an example embodiment described herein, image data for multiple frames of a moving image is transmitted from a first computer to a second computer over a network. A region of interest for all of the multiple frames in the moving image is identified by the first computer, where the first computer identifies the region of interest by calculations using the image data for at least some of the multiple frames. Image data for a first frame for the region of interest is encoded. Coordinates for the region of interest are transmitted from the first computer to the second computer. Encoded image data for a first frame for the region of interest is transmitted from the first computer to the second computer, where it is expected that the encoded image data will be decoded and displayed by the second computer at a position corresponding to the transmitted coordinates for the region of interest.

According to this embodiment, image data for a second frame subsequent in time to the first frame for the region of interest is encoded and transmitted from the first computer to the second computer, where it is expected that the encoded image data will be decoded and displayed by the second computer at a position corresponding to the transmitted coordinates for the region of interest.

Further to this embodiment, a region surrounding the region of interest is identified by the first computer. Image data for a first frame for the region surrounding the region of interest is encoded. Coordinates for the region surrounding the region of interest are transmitted from the first computer to the second computer. Encoded image data for the first frame for the region surrounding the region of interest is transmitted from the first computer to the second computer, where it is expected that the encoded image data will be decoded and displayed by the second computer at a position corresponding to the transmitted coordinates for the region surrounding the region of interest. Transmission of the encoded image data for the first frame for the region surrounding the region of interest is effected after transmission of encoded image data for both of the first and second frames for the region of interest.

By prioritizing the encoding and transmission of the regions of interest, it is ordinarily possible to reduce the amount of time needed to display the visually significant features of a moving image. In particular, since visually significant features in a region of interest are encoded and transmitted first, it is ordinarily possible to reduce the latency associated with encoding and transmitting image data containing both the region of interest and regions surrounding the region of interest, thereby improving the continuous, frame-by-frame, display of visually significant features in a moving image. As a result, in situations where the network bandwidth may be constrained or truncated, it is typically possible to stream the visually significant features over a larger number of frames than it would be possible using conventional methods.

In one example embodiment, the encoding of the region of interest and the region surrounding the region of interest is adjusted in quality depending on limitations imposed by a user or the network.

In another example embodiment, the image quality of the image data is scaled for each region surrounding the region of interest based on the distance between the region and the region of interest.

In yet another example embodiment, the encoding of image data, for one or both of the region of interest and the regions other than the region of interest, is performed in successive passes of increasing visual quality.

In other example embodiments described herein, image data for multiple frames of a moving image is received from a first computer at a second computer over a network. Coordinates for a region of interest are received from the first computer at the second computer. Encoded image data for a first frame for the region of interest is received and decoded at the second computer, where the encoded image data is displayed by the second computer at a position corresponding to the received coordinates for the region of interest.

According to this example embodiment, encoded image data for a second frame subsequent in time to the first frame for the region of interest is received and decoded at the second computer, where the encoded image data is displayed by the second computer at a position corresponding to the received coordinates for the region of interest.

Further to this embodiment, coordinates for a region surrounding the region of interest are received from the first computer at the second computer. Encoded image data for a first frame for the region surrounding the region of interest is received and decoded at the second computer, where the encoded image data is displayed by the second computer at a position corresponding to the received coordinates for the region surrounding the region of interest, and where receipt of the encoded image data for the first frame for the region surrounding the region of interest is effected after receipt of encoded image data for both of the first and second frames for the region of interest.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 7 is a view for explaining an example transmission order for moving image data, where the moving image data is comprised of blocks of pixels.

DETAILED DESCRIPTION

Figure 1:
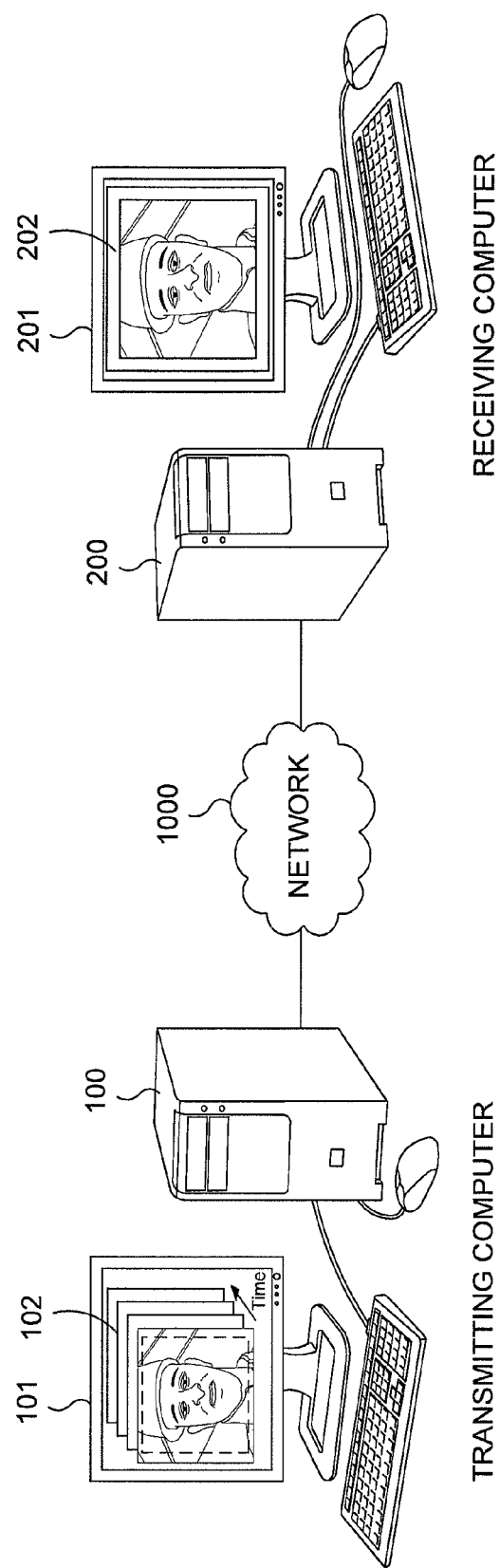
FIG. 1 is a representative view of computing equipment relevant to one example embodiment.

FIG. 1 is a representative view of computing equipment relevant to one example embodiment.

As shown in FIG. 1, transmitting computer 100 is connected to receiving computer 200 via network 1000. Transmitting computer 100 communicates with receiving computer 200 via network 1000 to transmit moving image data. As depicted diagrammatically in FIG. 1, transmitting computer 100 has multiple time-sequential frames of a moving image 102 for which encoding and transmission to receiving computer 200 is effected. FIG. 1 also shows receiving computer 200 displaying the moving image data 202 that was encoded and transmitted by transmitting computer 100.

The particular implementation, scale, and hardware of network 1000 may vary according to different embodiments. Thus, for example, network 1000 could be the Internet, a Local Area Network (LAN), Wide Area Network (WAN), Metropolitan Area Network (MAN), or Personal Area Network (PAN), among others. Network 1000 can be wired or wireless, and can be implemented, for example, as an Optical fiber, Ethernet, or Wireless LAN network. In addition, the network topology of network 1000 may also vary.

Figure 2:
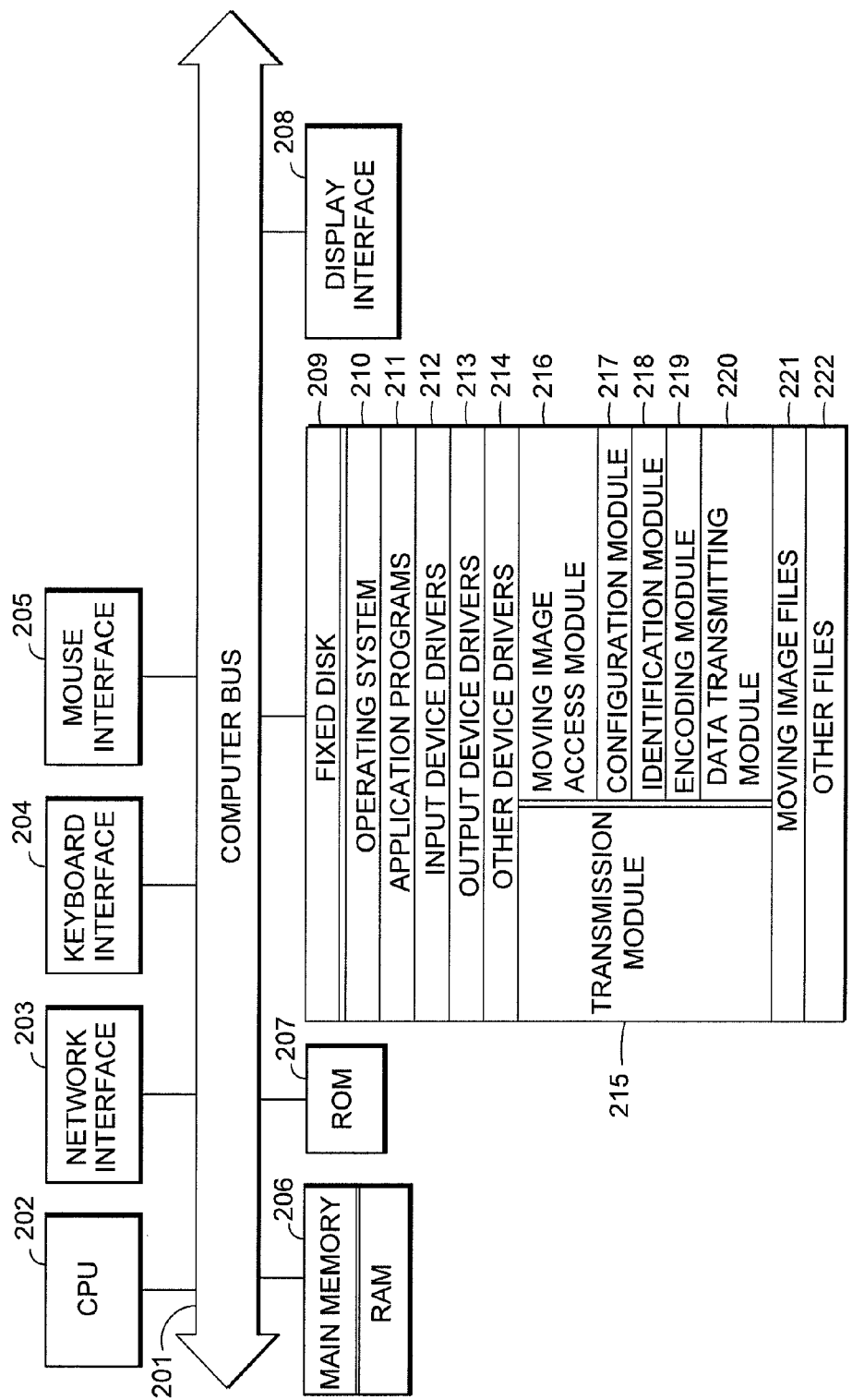
FIG. 2 is a detailed block diagram depicting the internal architecture of the transmitting computer shown in FIG. 1.

FIG. 2 is a detailed block diagram depicting the internal architecture of the transmitting computer 100 shown in FIG. 1.

As shown in FIG. 2, transmitting computer 100 includes central processing unit (CPU) 202 which interfaces with computer bus 201. Also interfacing with computer bus 201 are fixed disk 209 (e.g., a hard disk or other nonvolatile storage medium), network interface 203, keyboard interface 204, mouse interface 205, random access memory (RAM) 206 for use as a main run-time transient memory, read only memory (ROM) 207, display interface 208, and transmission module 215. Transmitting computer 100 may use network interface 203 to communicate with the receiving computer 200 via network 1000 (not shown).

RAM 206 interfaces with computer bus 201 so as to provide information stored in RAM 206 to CPU 202 during execution of the instructions in software programs, such as an operating system, application programs, image processing modules, and device drivers. More specifically, CPU 202 first loads computer-executable process steps from fixed disk 209, or another storage device into a region of RAM 206. CPU 202 can then execute the stored process steps from RAM 206 in order to execute the loaded computer-executable process steps. Data, such as moving image data, or other information, is stored in RAM 206 and the data is accessed by CPU 202 during the execution of the computer-executable software programs, to the extent that such software programs have a need to access and/or modify the data.

As also shown in FIG. 2, fixed disk 209 is an example of a computer-readable storage medium that stores computer-executable process steps for operating system 210, and application programs 211, such as word processing programs or graphic image management programs. Fixed disk 209 also stores computer-executable process steps for device drivers for software interface to devices, such as input device drivers 212, output device drivers 213, and other device drivers 214. Moving image files 221 are stored for encoding and transmission to the receiving computer 200.

Transmission module 215 comprises computer-executable process steps stored on a computer-readable storage medium for execution by a processor, such as CPU 202, to identify, encode, and transmit moving image data. Transmission module 215 generally comprises a moving image access module 216, a configuration module 217, an identification module 218, an encoding module 219, and a data transmitting module 220. These modules are described in greater detail below in connection with FIG. 4.

The computer-executable process steps for transmission module 215 may be configured as part of operating system 210, as part of an output device driver, such as an image processing driver, or as a stand-alone application program. Transmission module 215 may also be configured as a plug-in or dynamic link library (DLL) to the operating system, device driver or application program.

Figure 3:
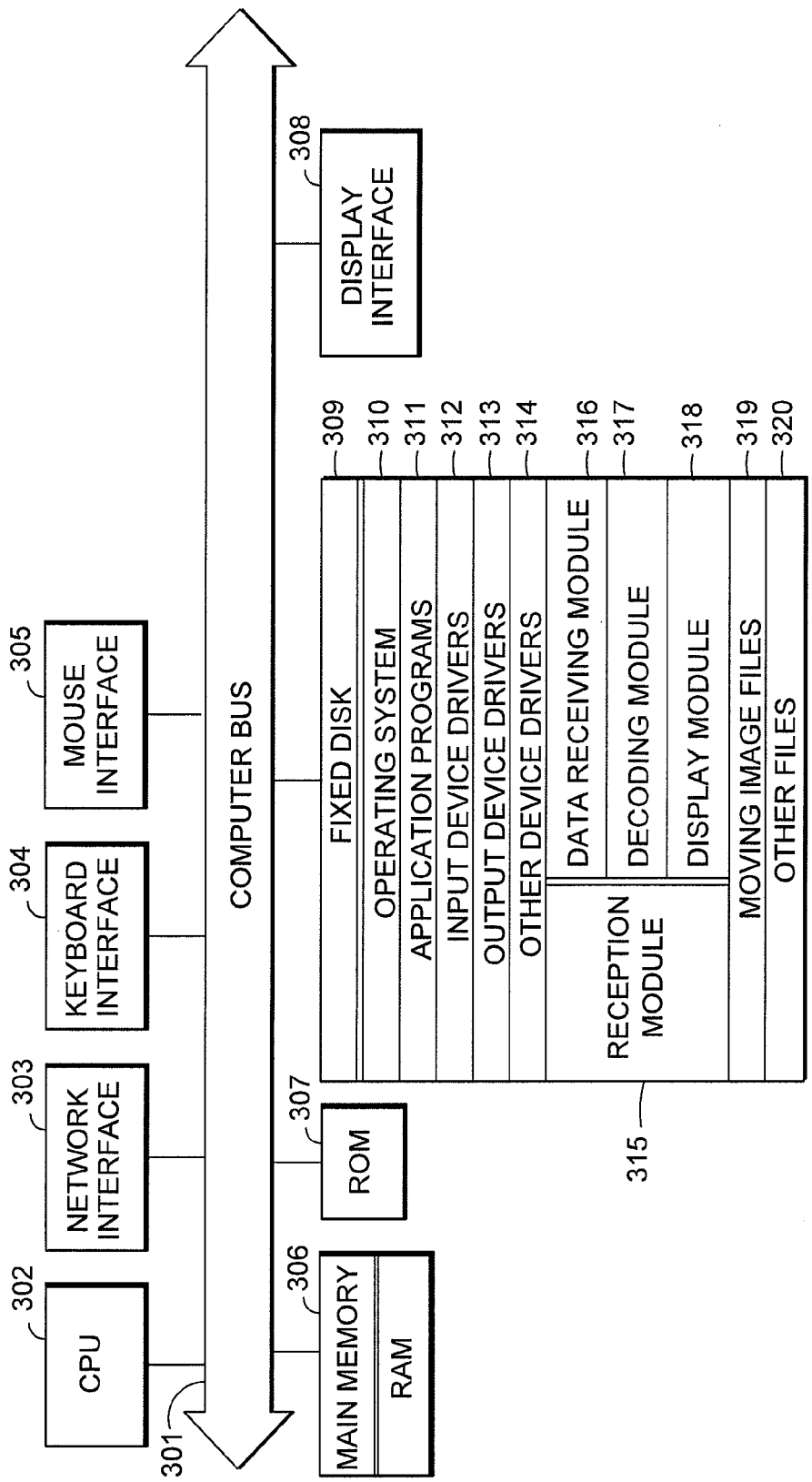
FIG. 3 is a detailed block diagram depicting the internal architecture of the receiving computer shown in FIG. 1.

FIG. 3 is a detailed block diagram depicting the internal architecture of receiving computer 200 shown in FIG. 1.

As shown in FIG. 3, receiving computer 200 includes central processing unit (CPU) 302 which interfaces with computer bus 301. Also interfacing with computer bus 301 are fixed disk 309 (e.g., a hard disk or other nonvolatile storage medium), network interface 303, keyboard interface 304, mouse interface 305, random access memory (RAM) 306 for use as a main run-time transient memory, read only memory (ROM) 307, display interface 308 for displaying received moving image data, and reception module 315. Receiving computer 200 may use network interface 303 to communicate with transmission computer 100 via network 1000 (not shown).

RAM 306 interfaces with computer bus 301 so as to provide information stored in RAM 306 to CPU 302 during execution of the instructions in software programs, such as an operating system, application programs, image processing modules, and device drivers. More specifically, CPU 302 first loads computer-executable process steps from fixed disk 309, or another storage device into a region of RAM 306. CPU 302 can then execute the stored process steps from RAM 306 in order to execute the loaded computer-executable process steps. Data or other information is stored in RAM 306 and the data is accessed by CPU 302 during the execution of the computer-executable software programs, to the extent that such software programs have a need to access and/or modify the data.

As also shown in FIG. 3, fixed disk 309 is an example of a computer-readable storage medium that stores computer-executable process steps for operating system 310, and application programs 311, such as word processing programs or graphic image management programs. Fixed disk 309 also stores computer-executable process steps for device drivers for software interface to devices, such as input device drivers 312, output device drivers 313, and other device drivers 314.

Reception module 315 comprises computer-executable process steps stored on a computer-readable storage medium for execution by a processor, such as CPU 302, to receive and decode moving image data. Reception module 315 generally comprises data receiving module 316, decoding module 317, and display module 318. These modules are described in greater detail below in connection with FIG. 4.

The computer-executable process steps for reception module 315 may be configured as part of operating system 310, as part of an output device driver, such as an image processing driver, or as a stand-alone application program. Reception module 315 may also be configured as a plug-in or dynamic link library (DLL) to the operating system, device driver or application program.

Figure 4:
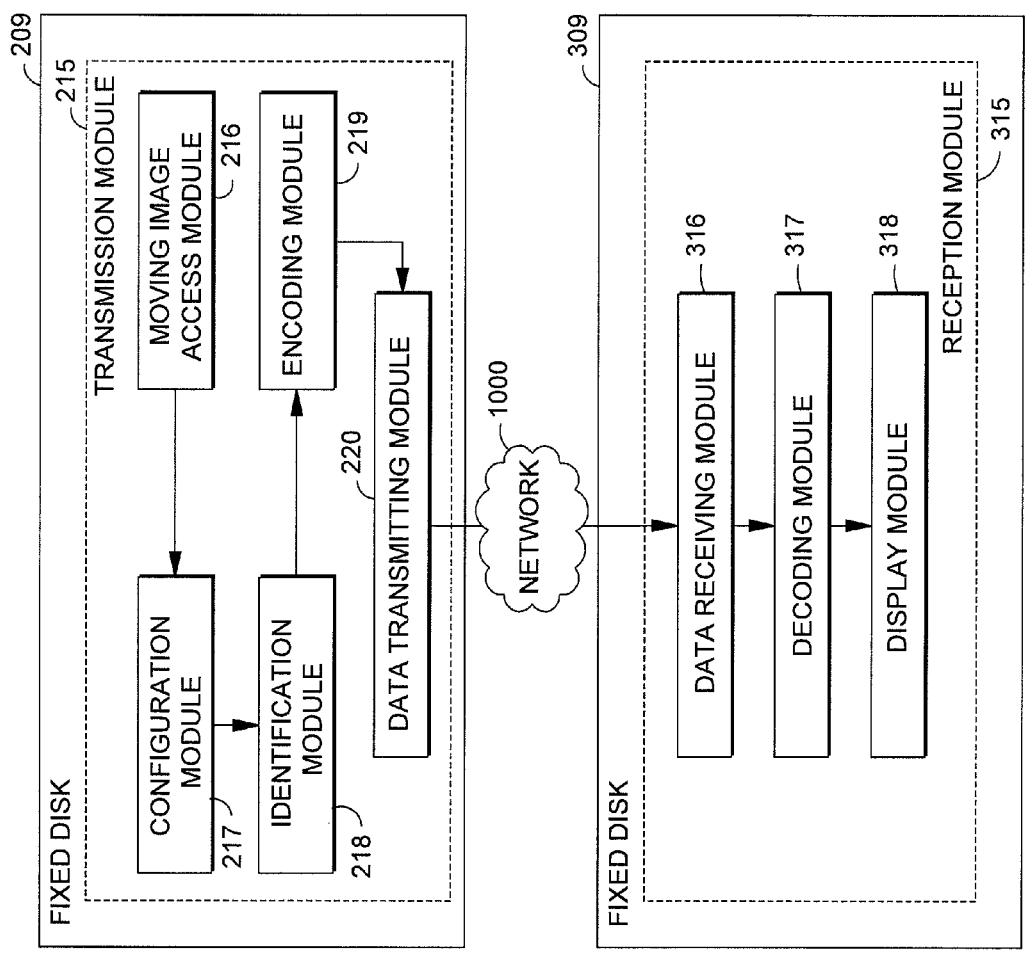
FIG. 4 illustrates interaction between an example transmission module and an example reception module.

FIG. 4 illustrates interaction between an example transmission module 215 and an example reception module 315.

In particular, FIG. 4 illustrates one example of transmission module 215 in which the sub-modules of transmission module 215 are stored in fixed disk 209. Specifically, FIG. 4 illustrates one example of the transmission module 215 that is constructed to transmit image data of a moving image from the transmitting computer 100 to the receiving computer 200 over a network 1000. As shown in FIG. 4, transmission module 215 comprises a moving image access module 216, a configuration module 217, an identification module 218, an encoding module 219, and a data transmitting module 220. Each of these modules are computer-executable software code or process steps executable by a processor, such as CPU 202, and are stored on a computer-readable storage medium, such as fixed disk 209 or RAM 206. More or fewer modules may be used than shown in FIG. 4, and other architectures are possible.

As shown in FIG. 4, the transmission module 215 includes a moving image access module 216 that is constructed to access moving image files for transmission to the receiving computer 200.

Transmission module 215 includes a configuration module 217 that is constructed to establish the encoding quality of the moving image files selected for transmission to the receiving computer 200.

In one example embodiment, the configuration module 217 is constructed to adjust in quality the encoding of the region of interest and the region surrounding the region of interest depending on limitations imposed by a user or the network.

Transmission module 215 further includes an identification module 218 that is constructed to identify a region of interest for all of the multiple frames in the moving image using face detection calculations on the image data, where the region of interest is identified by calculations using the image data for at least some of the multiple frames.

According to another example embodiment, the identification module 218 is constructed to identify a region of interest using edge detection calculations on the image data for some of the multiple frames. In another example embodiment, the identification module 218 is constructed to identify a region of interest using spatial frequency calculations on the image data for some of the multiple frames. In a yet another example embodiment, the identification module 218 is constructed to identify a region of interest by incorporating machine learning techniques, where the machine learning techniques analyze samples of image data for some of the multiple frames, and where the region of interest is identified based on patterns uncovered from analyzing the samples.

According to a further example embodiment, the identification module 218 is constructed to identify a region of interest by incorporating data mining techniques, where the data mining techniques analyze samples of image data for some of the multiple frames, and where the region of interest is identified based on patterns uncovered from analyzing the samples. In another example embodiment, the identification module 218 is constructed to identify a region of interest using metadata for the image data for some of the multiple frames, where the metadata for the image data provides image content information for the image data, and where the region of interest is identified based on the image content information. In yet another example embodiment, the identification module 218 is constructed to identify a region of interest using block recognition techniques on the image data for some of the multiple frames. These embodiments are discussed in more detail below.

The identification module 218 is also constructed to identify regions surrounding the region of interest for encoding and transmission to a receiving computer 200.

Transmission module 215 also includes an encoding module 219 that is constructed to convert each frame in a moving image from RGB color space to $Y'C_BC_R$ color space, and to store the image data in separate Y' (luminance), $C_B$ (chrominance blue) and $C_R$ (chrominance red) color planes. The encoding module 219 is also constructed to divide frames in a moving image into groups of pictures (GOP), and to establish a virtual frame around each region of interest for each frame in the moving image. Further, the encoding module 219 is constructed to encode the moving image data. Specifically, the encoding module 219 is constructed to encode image data for a first and second frame for a region of interest, and to encode image data for a first frame for a region surrounding the region of interest.

In one example embodiment, the encoding module 219 is constructed to encode image data to produce a lossless transmission.

In another example embodiment, the encoding module 219 is constructed to scale the image data for each region surrounding the region of interest based on the distance between the region and the region of interest.

Transmission module 215 further includes a data transmitting module 220 that is constructed to transmit coordinates for the region of interest and for the region surrounding the region of interest from the transmitting computer 100 to the receiving computer 200. In addition, the data transmitting module 220 is constructed to transmit encoded image data for a first and second frame for the region of interest to the receiving computer 200 for decoding and display by the receiving computer 200 at a position corresponding to the transmitted coordinates for the region of interest. Further, the data transmitting module 220 is also constructed to transmit the encoded image data for a first frame for the region surrounding the region of interest to the receiving computer 200 for decoding and display by the receiving computer 200 at a position corresponding to the transmitted coordinates for the region surrounding the region of interest.

The data transmitting module 220 is also constructed to transmit decoding information, such as, the block quality scale map, information about the structure of the compressed data and the compression options used during encoding, block prediction information, and information about the complete video sequence.

In one example embodiment, the data transmitting module 220 is constructed to package the encoded image data and the coordinates corresponding to the encoded image data into a data packet, one after the other, wherein the steps of transmitting coordinates and transmitting the encoded image data are comprised by transmitting the data packet.

FIG. 4 also illustrates one example of reception module 315 in which the sub-modules of reception module 315 are stored in fixed disk 309. Specifically, FIG. 4 illustrates one example of the reception module 315 that is constructed to receive image data of a moving image from the transmitting computer 100 at the receiving computer 200 over a network. As shown in FIG. 4, reception module 315 comprises a data receiving module 316, a decoding module 317, and a display module 318. Each of these modules are computer-executable software code or process steps executable by a processor, such as CPU 302, and are stored on a computer-readable storage medium, such as fixed disk 309 or RAM 306. More or fewer modules may be used than shown in FIG. 4, and other architectures are possible.

As shown in FIG. 4, the reception module 315 includes a data receiving module 316 that is constructed to receive coordinates for the region of interest and the region surrounding the region of interest. In addition, the data receiving module 315 is constructed to receive image data for a first and second frame for a region of interest, and further constructed to receive image data for a first frame for the region surrounding the region of interest.

The data receiving module 316 is also constructed to receive decoding information, such as, the block quality scale map, information about the structure of the compressed data and the compression options used during encoding, block prediction information, and information about the complete video sequence.

In one example embodiment, the data receiving module 316 is constructed to receive the encoded image data and the coordinates corresponding to the encoded image data as a data packet, and further constructed to unpackage the data packet to retrieve the image data and the coordinates corresponding to the image data, wherein the steps of receiving the encoded image data and the coordinates corresponding to the encoded image data are comprised by receiving the data packet.

Reception module 315 includes a decoding module 317 that is constructed to decode the received encoded image data for the region of interest and the region surrounding the region of interest, and to convert the decoded image data from $Y'C_BC_R$ color space to RGB color space.

Reception module 315 also includes a display module 318 that is constructed to display the decoded portion of the encoded image data for the first and second frames of the region of interest at a position corresponding to the received coordinates for the region of interest, and further constructed to display the decoded portion of the encoded image data for the first frame for the region surrounding the region of interest at a position corresponding to the received coordinates for the region surrounding the region of interest.

Figure 5:
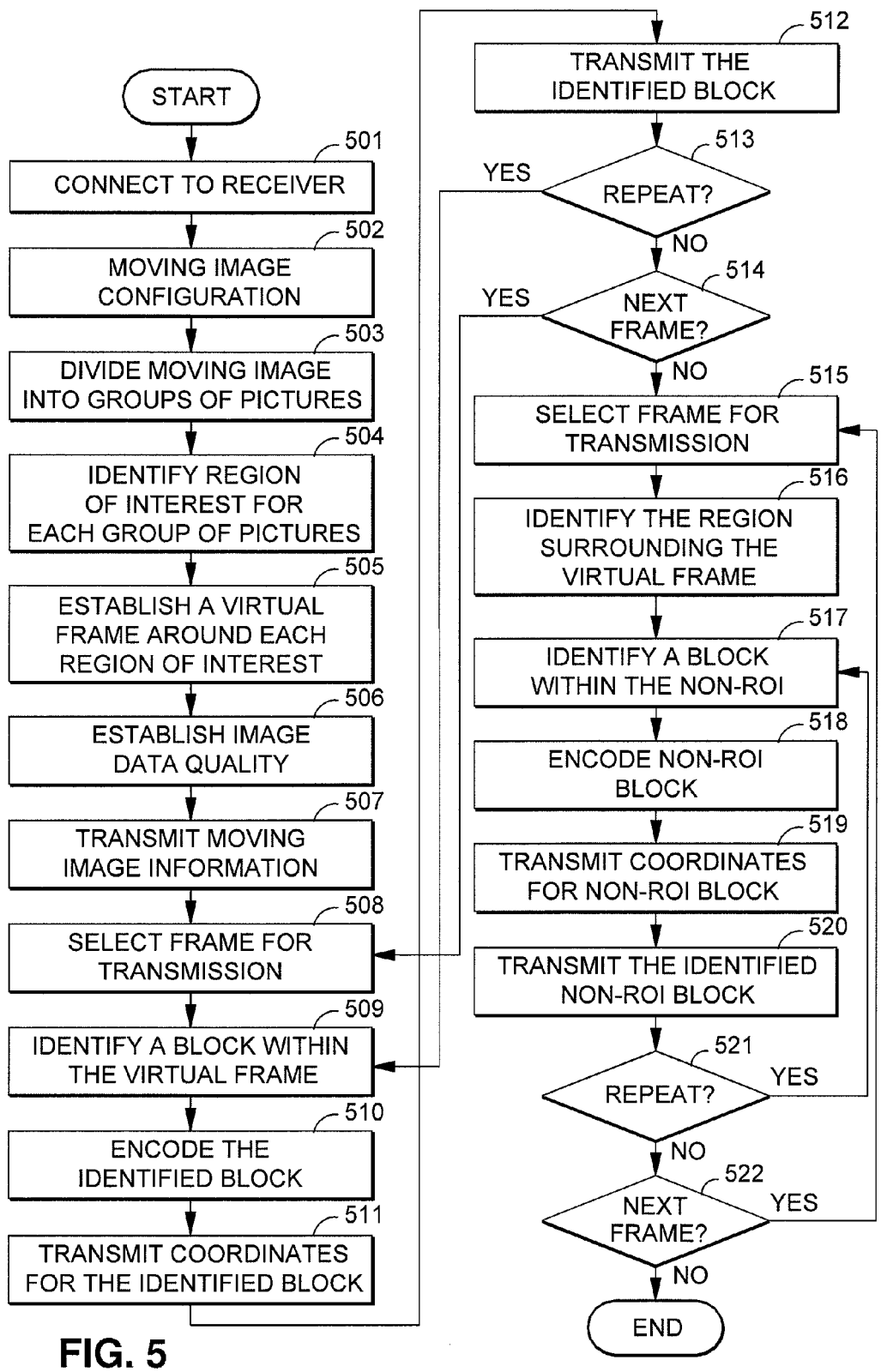
FIG. 5 is a flowchart illustrating an example process for explaining the moving image transmission process.

FIG. 5 is a flowchart illustrating an example process for explaining the moving image transmission process.

Briefly, in FIG. 5, image data for multiple frames of a moving image is transmitted from a first computer to a second computer over a network. A region of interest for all of the multiple frames in the moving image is identified by the first computer, where the first computer identifies the region of interest by calculations using the image data for at least some of the multiple frames. Image data for a first frame for the region of interest is encoded. Coordinates for the region of interest are transmitted from the first computer to the second computer. Encoded image data for a first frame for the region of interest is transmitted to the second computer for decoding and display by the second computer at a position corresponding to the transmitted coordinates for the region of interest.

According to this embodiment, image data for a second frame subsequent in time to the first frame for the region of interest is encoded and transmitted to the second computer for decoding and display by the second computer at a position corresponding to the transmitted coordinates for the region of interest.

Further to this embodiment, a region surrounding the region of interest is identified by the first computer. Image data for the first frame for the region surrounding the region of interest is encoded. Coordinates for the region surrounding the region of interest are transmitted from the first computer to the second computer. Encoded image data for the first frame for the region surrounding the region of interest is transmitted to the second computer for decoding and display by the second computer at a position corresponding to the transmitted coordinates for the region surrounding the region of interest, where transmission of the encoded image data for the first frame for the region surrounding the region of interest is effected after transmission of encoded image data for both of the first and second frames for the region of interest.

In more detail, the process in the transmitting computer 100 starts with step 501, where the transmitting computer 100 establishes a connection with the receiving computer 200 via network 1000. For example, a network connection may be established using either a connection-oriented protocol, such as the Transmission Control Protocol (TCP), or a connectionless-oriented protocol, e.g., the User Datagram Protocol (UDP). The connection may be established by the transmitting computer 100 or by the receiving computer 200.

In step 502, a moving image is identified by moving image access module 216 of transmitting computer 100, and configured for transmission. In this regard, the configuration module 217 of transmitting computer 100 establishes the encoding quality of the moving image data by defining quality variables, such as Qmin and Qmax. The Qmin quality variable defines the lowest quality at which image data will be encoded. The Qmax quality variable defines the highest quality at which moving image data will be encoded. According to this embodiment, Qmin and Qmax are predefined to encode the moving image data at a low quality level and a high quality level. As an example, a Qmin and a Qmax set to 100 signifies that the region of interest and the regions surrounding the region of interest will be encoded at full image quality. The encoding process is explained more fully below in connection with step 506.

In an another embodiment, the encoding quality of the region of interest and the region surrounding the region of interest is adjusted depending on limitations imposed by a user or the network. For example, the Qmin and Qmax quality variables may be set manually by a user. Alternatively, the Qmin and Qmax quality variables may be set automatically based on the level of traffic detected in the network.

The encoding module 219 of transmitting computer 100 prepares the moving image for encoding and transmission to the receiving computer 200 by converting each frame in the moving image from RGB color space to $Y'C_BC_R$ color space, and storing the converted image data in separate Y' (luminance), $C_B$ (chrominance blue) and $C_R$ (chrominance red) color planes. The image data for the Y', $C_B$, and $C_R$ color planes is stored for later processing, as discussed below. For example, the image data may be stored in arrays, where the image data for each color plane is stored in a separate array.

In step 503, the encoding module 219 of transmitting computer 100 divides each frame in the moving image into groups of pictures (GOP) to determine whether a particular frame is to be intracoded (I-frame) or intercoded (P- or B-frame). An intracoded frame (I-frame) is a self-contained frame that is capable of being independently decoded without any reference to other frames in the group of pictures. An intercoded frame (P-frame) is a predictive frame that requires the receiving computer 200 to reference back to an earlier I-frame or earlier P-frames for that group of pictures before it can be decoded.

According to the example embodiment described herein, each group of pictures is defined to consist of one intracoded frame (I-frame), followed by three intercoded predicted frames (P-frames). Therefore, each group of pictures contains four frames, where the four frames have an IPPP frame structure. The GOP structure is used to facilitate the identification of a region of interest, as discussed more fully below in step 504.

The number of frames contained in a group of pictures is not limited to a specific quantity, so long as there are plural such frames, and the size of a group of pictures can be increased or decreased.

In step 504, a region of interest is identified for all of the multiple frames in the moving image, where the identification module 218 of transmitting computer 100 identifies the region of interest by face detection calculations using the image data for at least some of the multiple frames.

In the example embodiment described herein, the region of interest is identified for each group of pictures using image data for the first frame, i.e., the I-frame, of that group of pictures. For example, a moving image comprised of eight frames will be divided into two groups of pictures, where each group of pictures has an IPPP frame structure. According to this example, the identification module 218 of transmitting computer 100 identifies a region of interest for the first group of pictures by face detection calculations using image data from the I-frame associated with that first group of pictures. In this regard, the identification module 218 of transmitting computer 100 performs face detection calculations on image data from the I-frame, for each Y', $C_B$, and $C_R$ color plane that was previously separated in step 502.

Once a region of interest is identified for the I-frame, the identification module 218 of transmitting computer 100 assumes that the remaining P-frames for that first group of pictures contain the same region of interest. Accordingly, for the first group of pictures, the location for the region of interest for the P-frames is the same as the location of the region of interest that was identified for the I-frame. Similarly, the identification module 218 of transmitting computer 100 identifies a region of interest for the second group of pictures by face detection calculations using image data from the I-frame associated with the second group of pictures. Furthermore, the P-frames for the second group of pictures will have the same region of interest as the region of interest that was identified for the I-frame for the second group of pictures.

In other embodiments, identification of regions of interest can be effected using calculations on the image data different from or in combination with face detection calculations. For example, in another example embodiment, the identification module 218 of transmitting computer 100 identifies the region of interest using edge detection calculations on the image data for some of the multiple frames, where a region of interest may be identified by detecting discontinuities in the image brightness.

In still another example embodiment, the identification of the region of interest uses spatial frequency calculations on the image data for some of the multiple frames. Since different spatial frequencies convey different information about the appearance of a stimulus, the identification module 218 of transmitting computer 100 may identify a region of interest based on the type of spatial frequency detected. For example, a high spatial frequency may indicate edges that characterize an in-focus foreground region of interest, whereas a low spatial frequency may indicate an out-of-focus background region of lesser interest.

The present disclosure contemplates incorporating machine learning and data mining techniques into the region of interest identification techniques described above, thereby facilitating detection of the region of interest based on patterns uncovered in samples of data.

In one example embodiment, the identification module 218 of transmitting computer 100 identifies the region of interest by incorporating machine learning techniques, where the machine learning techniques analyze samples of image data for some of the multiple frames, and where the region of interest is identified based on patterns uncovered from analyzing the samples.

In another example embodiment, the identification module 218 of transmitting computer 100 identifies the region of interest by incorporating data mining techniques, where the data mining techniques analyze samples of image data for some of the multiple frames, and where the region of interest is identified based on patterns uncovered from analyzing the samples.

Metadata may also be incorporated into the image data, in order to provide information on the content of the moving image. Thus, in another example embodiment, the identification module 218 of transmitting computer 100 identifies the region of interest using metadata for the image data for some of the multiple frames, where the metadata for the image data provides image content information for the image data, and where the region of interest is identified based on the image content information.

As a result, the region of interest identification techniques may distinguish between specific faces shown in a moving image. For example, in a moving image containing multiple faces, the region of interest identification techniques may be able to distinguish between an individual's friends and non-friends.

Further, using the machine learning, data mining, or metadata techniques described above, the region of interest may be identified based on a given setting. For example, if information derived from data mining indicates that a moving image is of a wedding, the region of interest techniques may identify the bride and groom as the regions of interest. In a further example, if the metadata associated with a moving image indicates that the moving image is of a race track, the region of interest techniques may identify cars or horses as the regions of interest.

Further to the above, block recognition or block selection techniques may be employed to identify a region of interest. In one example embodiment, the identification module 218 of transmitting computer 100 identifies the region of interest using block recognition techniques on the image data for some of the multiple frames. Block recognition or block selection techniques classify different regions of some of the multiple frames of a moving image into different classifications, based on characteristics of the regions. For example, a region of interest may be identified by identifying the individual blocks of pixels that represent the region of interest.

The present disclosure also contemplates the identification and transmission of a plurality of regions of interest.

In step 505, the encoding module 219 of transmitting computer 100 establishes a virtual frame around each region of interest for each frame in the moving image. Image data contained within the virtual frame is given encoding and transmission priority, as discussed more fully below, in connection with steps 509 to 512. The virtual frame also signifies the minimum amount of information that is to be encoded and transmitted during any given iteration.

Figure 8A:
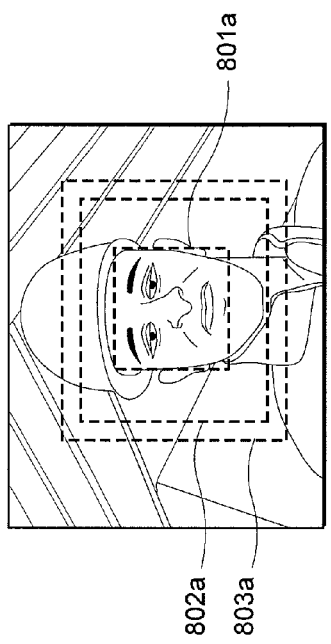
FIG. 8A illustrates a virtual frame that has been established for a frame in a moving image.

By way of example, FIG. 8A, depicts a frame in which a virtual frame has been established. In this example, the frame is shown as having three separate borders. The inner border encompasses the identified region of interest 801a. The middle border encompasses the virtual frame 802a. According to the present example embodiment, all image data contained within the virtual frame will be transmitted first, followed by the image data located outside of the virtual frame. The outer border 803a is used during the encoding process for computing block prediction information for the intercoded frames, as discussed more fully below in step 510.

In step 506, the encoding module 219 of transmitting computer 100 performs calculations to determine the encoding quality at which the region of interest and the region surrounding the region of interest will be encoded.

According to the embodiment described herein, the region of interest and the region surrounding the region of interest are comprised of blocks of pixels, where the steps of encoding and transmitting are performed on the blocks of pixels.

Each frame of the moving image is processed as blocks of pixels. Accordingly, the image quality for the region of interest and the region surrounding the region of interest is established by adjusting image quality for the blocks of pixels located within the region of interest and the region surrounding the region of interest, respectively.

Further to the embodiment described herein, the encoding quality of the image data is scaled for each region surrounding the region of interest based on a distance between each region and the region of interest.

The encoding module 219 of transmitting computer 100 locates the block of pixels located at the center of the region of interest ("ROI center") and calculates the distance between the ROI center and each block of pixels for the frame. These distance values are then stored for later processing, as discussed below. The distance values may be stored in an array or a similar data structure.

Using the distance values, the encoding module 219 of transmitting computer 100 sets the quality value (Q value) for all blocks of pixels for the region of interest to Qmax, which was previously set in step 502. Accordingly, the entire region of interest is designated to be encoded at full image quality.

The encoding module 219 of transmitting computer 100 also sets the Q value for the block of pixels that is located furthest from the ROI center to Qmin, which was previously set in step 502. In other words, the block of pixels located furthest from the ROI center will be encoded at a reduced quality.

The encoding module 219 of transmitting computer 100 also generates Q values for all surrounding blocks of pixels located between the ROI center and the block of pixels located furthest from the ROI center. The Q value for each block of pixels is stored. The Q value may be stored in an array or a similar data structure.

Using the Q value for each block of pixels, the encoding module 219 of transmitting computer 100 also determines a scale value for each block of pixels and stores the scale values for later processing. The scale values may be stored in an array or a similar data structure. The scale values for all of the blocks of pixels comprise a block quality map. In particular, the block quality map is used during the encoding process, as discussed in step 510, and is also transmitted to receiving computer 200 to facilitate the decoding process, as discussed further in FIG. 6.

A formula is used to determine the scale value for each block of pixels, as shown below.

---

If (Q value(i, j) < 50)
    Scale(i, j) = 5000 / Q value(i, j)
Else
    Scale(i, j) = 200 − 2 × Q value(i, j)

---

In the formula above, the coordinates i, j represent the Q value or the Scale value associated with a particular block of pixels. According to the formula, blocks of pixels with a Q value less than 50 are given a Scale value of 5000/Q value(i, j), thereby reducing the quality for those blocks of pixels. Alternatively, blocks of pixels with a Q value exceeding 50 are given a Scale value of 200−2×Q value(i, j), thereby increasing the quality for those blocks of pixels.

Alternative methods of determining image quality may also be employed.

Thus, according to another example embodiment, the encoding quality of the region of interest and the region surrounding the region of interest is adjusted depending on limitations imposed by a user or the network.

In step 507, the data transmitting module 220 of transmitting computer 100 transmits moving image information to receiving computer 200, including the block quality scale map, information about the structure of the compressed data and the compression options used during encoding, block prediction information to be used for reconstructing image data, and information about the complete video sequence. The information transmitted to receiving computer 200 facilitates the decoding process, as discussed more fully in connection with FIG. 6.

In step 508, the identification module 218 of transmitting computer 100 selects a first frame for the region of interest for transmission to receiving computer 200. In the example embodiment described herein, frames of a moving image are selected sequentially, beginning with the first frame for the moving image, and proceeding one by one, down to the last frame for the moving image.

In step 509, the identification module 218 of transmitting computer 100 identifies a block of pixels located within the first frame for the region of interest for transmission to receiving computer 200.

According to this embodiment, the blocks of pixels are transmitted in an order starting from the center of the region of interest and spiraling outwardly toward the edges of the region of interest.

As depicted in FIG. 7, the order of transmission for the blocks of pixels begins at the center of the region of interest ("ROI center") and proceeds in a spiraling pattern to the blocks located at the edges of the frame.

In step 510, image data for a first frame for the region of interest is encoded, and, is encoded at the image quality level that was established for that block in step 506.

The encoding process for a block of pixels varies based on whether the frame being processed is defined an I-frame (intracoded) or as a P-frame (intercoded). As discussed earlier, a block of pixels in an I-frame is encoded using image data contained within the same frame. A block of pixels in a P-frame is encoded using image data from similar regions in previously-coded frames. The type of encoding used for each frame depends on whether the frame was previously identified as an I-frame or as a P-frame, in connection with step 503.

In more detail, the encoding process begins by forming a prediction for the block of pixels based on previously-coded data, either from the same frame (intracoded) or from other frames that have already been encoded and transmitted (intercoded). The prediction for the block of pixels is then subtracted from the block of pixels to form a residual. Residual samples are then transformed using an integer transform, which is a method similar to the Discrete Cosine Transform (DCT). The transform process yields transform coefficients, each of which is a weighing value for a standard basis pattern. As discussed more fully in FIG. 6, the combination of the transform coefficients and the standard basis patterns recreates the residual samples.

The transform coefficients are quantized. The quantization step allows manipulation of the quality level at which the block of pixels will be encoded. In this regard, each coefficient is divided by a quantization parameter, where the quantization parameter is defined according to the block quality map that was determined in step 506. The size of the quantization parameter influences the visual quality of the block of pixels. For example, dividing a coefficient by a high quantization parameter is likely to result in that coefficient being set to zero. Quantized coefficients having a zero value result in higher compression rates, but also result in a reduction in image quality. Further, dividing a coefficient by a low quantization parameter is likely to result in a quantized coefficient having a non-zero value. Similarly, quantized coefficients having a non-zero value result in lower compression rates, but yield higher image quality.

This process is repeated for each block of pixels in the frame, for each Y', $C_B$ and $C_R$ color plane. In other words, the encoding module 219 of transmitting computer 100 generates quantized coefficients for each block of pixels three times, where one set of coefficients is generated for the Y' color plane, another set for the $C_B$ color plane, and another set for the $C_R$ color plane. These calculations are performed using the image data that was stored for the Y', $C_B$ and $C_R$ color planes in step 502. The encoding module 219 of transmitting computer 100 then encodes the quantized coefficients using block prediction information and information about the structure of the compressed data to produce a compressed bitstream.

The present disclosure also contemplates that the encoding step may be performed using other encoding methods as well.

Thus, in an alternative example embodiment, the encoding of image data for one or both of the region of interest and the regions other than the region of interest is performed in successive passes of increasing visual quality.

In step 511, coordinates for the region of interest are transmitted from the transmitting computer 100 to the receiving computer 200. Specifically, the data transmitting module 220 of transmitting computer 100 transmits coordinates for the block of pixels for the region of interest that was identified in step 509. As an example, the transmitted coordinates may be x, y coordinates, where such coordinates respectively correspond to the horizontal and vertical addresses of the block of pixels being transmitted with respect to the original frame.

In step 512, encoded image data for a first frame for the region of interest is transmitted from the transmitting computer 100 to the receiving computer 200 for display by the receiving computer 200 at a position corresponding to the transmitted coordinates for the region of interest. In more detail, the data transmitting module 220 of transmitting computer 100 transmits the compressed bitstream for the block of pixels to the receiving computer 200 for display.

According to the example embodiment described herein, the image data is encoded to produce a lossy transmission.

In other alternative embodiments, the image data is encoded to produce a lossless transmission.

The present disclosure also contemplates a different ordering for transmission of the coordinates and transmission of the encoded image data, and the present embodiments can be adapted to transmit the coordinates and the encoded image data in either order.

Thus, according to an alternative example embodiment, the encoded image data and the coordinates corresponding to the encoded image data are packaged into a data packet, one after the other, where the steps of transmitting coordinates and transmitting the encoded image data are comprised by transmitting the data packet.

In step 513, the data transmitting module 220 of transmitting computer 100 determines if additional blocks of pixels for the first frame for the region of interest remain to be transmitted. If blocks of pixels for the first frame for the region of interest still remain to be transmitted, the transmitting computer 100 proceeds to step 509, and identifies the next block of pixels located within the first frame for the region of interest, as described above. Otherwise, the transmitting computer 100 continues to step 514.

In step 514, the data transmitting module 220 of transmitting computer 100 determines if image data for a second frame subsequent in time to the first frame for the region of interest still remains to be encoded and transmitted. If a second frame subsequent in time to the first frame for the region of interest still remains to be encoded and transmitted, the transmitting computer 100 proceeds to step 508. In particular, image data for a second frame subsequent in time to the first frame for the region of interest is encoded, and the encoded image data for the second frame for the region of interest is transmitted from the transmitting computer 100 to the receiving computer 200 for decoding and display by the receiving computer 200 at a position corresponding to the transmitted coordinates for the region of interest. Otherwise, the transmitting computer 100 continues to step 515.

In one example embodiment described herein, the steps of identifying a region of interest; encoding image data for a first frame for the region of interest; transmitting coordinates for the region of interest; transmitting the encoded image data for the first frame for the region of interest; encoding image data for a second frame subsequent in time to the first frame for the region of interest; transmitting encoded image data for the second frame for the region of interest; are repeated for each subsequent frame until encoded image data for the region of interest is transmitted for an entirety of the moving image.

Further to this embodiment, the steps of identifying a region surrounding the region of interest by the transmitting computer 100; encoding image data for the first frame for the region surrounding the region of interest; transmitting coordinates for the region surrounding the region of interest; and transmitting the encoded image data for the first frame for the region surrounding the region of interest; are repeated for each subsequent frame until encoded image data for the region surrounding the region of interest is transmitted, for an entirety of the moving image.

Thus, in step 515, the identification module 218 of transmitting computer 100 selects a first frame for the region surrounding the region of interest for transmission to the receiving computer 200.

In step 516, the identification module 218 of transmitting computer 100 identifies a region surrounding the region of interest. In particular, the identification module 218 of transmitting computer 100 identifies the next region that is immediately adjacent to the virtual frame, as depicted in FIG. 7.

In step 517, the identification module 218 of transmitting computer 100 identifies a block of pixels located within the first frame for the region surrounding the region of interest for transmission to the receiving computer 200.

As stated earlier, according to the embodiment described herein, the blocks of pixels are transmitted in an order starting from the center of the region of interest and spiraling outwardly toward the edges of the region of interest, as depicted more fully below with respect to FIG. 7.

In step 518, image data for a first frame for the region surrounding the region of interest is encoded.

In particular, the block of pixels identified in step 517 is encoded at the image quality level that was determined for that block at step 506. The encoding process follows the same intracoding and intercoding methods that were discussed in step 510.

In step 519, coordinates for the region surrounding the region of interest are transmitted from the transmitting computer 100 to the receiving computer 200. Specifically, the data transmitting module 220 of transmitting computer 100 transmits coordinates for the block of pixels for the region surrounding the region of interest that was identified in step 517. As an example, the transmitted coordinates may be x, y coordinates, where such coordinates respectively correspond to the horizontal and vertical addresses of the block of pixels being transmitted with respect to the original frame.

In step 520, encoded image data for a first frame for the region surrounding the region of interest is transmitted from the transmitting computer 100 to the receiving computer 200 for decoding and display by the receiving computer 200 at a position corresponding to the transmitted coordinates for the region surrounding the region of interest, where transmission of the encoded image data for the first frame for the region surrounding the region of interest is effected after transmission of encoded image data for both of the first and second frames for the region of interest. In more detail, the data transmitting module 220 of transmitting computer 100 transmits the compressed bitstream for the block of pixels that was produced in step 518.

In step 521, the data transmitting module 220 of transmitting computer 100 determines if additional blocks of pixels for the first frame for the region surrounding the region of interest remain to be transmitted. If blocks of pixels for the first frame for the region surrounding the region of interest still remain to be transmitted, the transmitting computer 100 proceeds to step 517, and identifies and transmits the next block of pixels located within the first frame for the region surrounding the region of interest, as described above. Otherwise, the transmitting computer 100 continues to step 522.

In one example embodiment described herein, after transmission of encoded image data for the first frame for the region surrounding the region of interest, the transmitting computer 100 encodes and transmits image data for a second frame subsequent in time to the first frame for the region surrounding the region of interest to the receiving computer 200 for decoding and display by the receiving computer 200 at a position corresponding to the transmitted coordinates for the region surrounding the region of interest.

Accordingly, in step 522, the data transmitting module 220 of transmitting computer 100 determines if image data for a second frame subsequent in time to the first frame for the region surrounding the region of interest remains to be encoded and transmitted. If a second frame subsequent in time to the first frame for the region surrounding the region of interest still remains to be encoded and transmitted, the transmitting computer 100 proceeds to step 515, and selects a second frame subsequent in time to the first frame for encoding and transmission. Otherwise, the transmitting computer 100 ends the transmission process.

In one example embodiment described herein, the steps of identifying a region of interest; encoding image data for a first frame for the region of interest; transmitting coordinates for the region of interest; transmitting the encoded image data for the first frame for the region of interest; encoding image data for a second frame subsequent in time to the first frame for the region of interest; transmitting the encoded image data for the second frame for the region of interest; are repeated for each subsequent frame until encoded image data for the region of interest is transmitted for an entirety of the moving image.

Further to this embodiment, the steps of identifying a region surrounding the region of interest; encoding image data for the first frame for the region surrounding the region of interest; transmitting coordinates for the region surrounding the region of interest; and transmitting the encoded image data for the first frame for the region surrounding the region of interest; are repeated for each subsequent frame until encoded image data for the region surrounding the region of interest is transmitted, for an entirety of the moving image.

Figure 6:
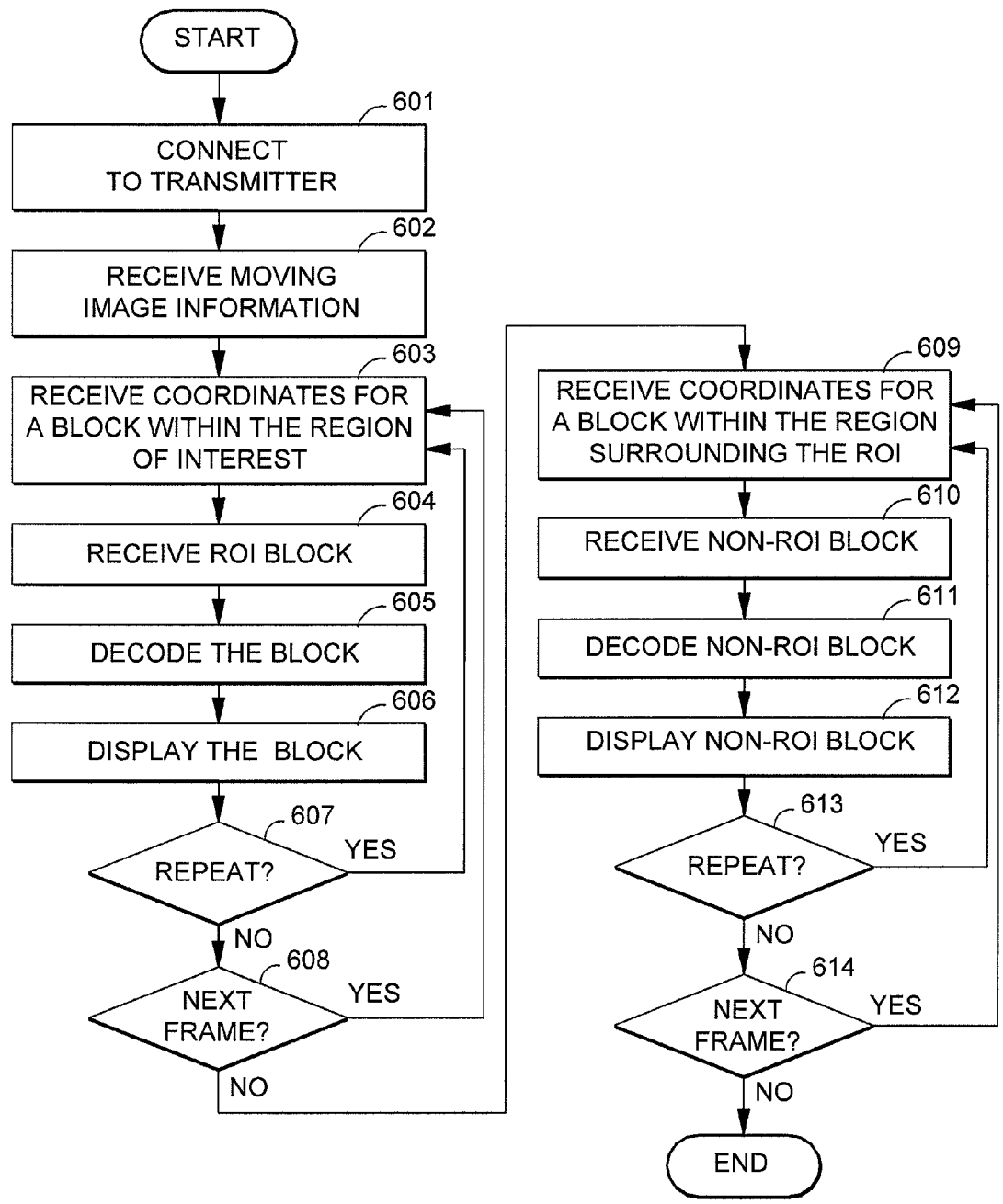
FIG. 6 is a flowchart illustrating an example process for explaining the moving image reception process.

FIG. 6 is a flowchart illustrating an example process for the moving image reception process.

Briefly, image data for multiple frames of a moving image is received from a first computer at a second computer over a network. In this regard, coordinates for a region of interest are received from the first computer at the second computer. Encoded image data for a first frame for the region of interest is received. The encoded image data for the first frame for the region of interest is decoded and displayed at a position corresponding to the received coordinates for the region of interest.

According to this embodiment, encoded image data for a second frame subsequent in time to the first frame for the region of interest is received. The encoded image data for the second frame for the region of interest is decoded and displayed at a position corresponding to the received coordinates for the region of interest.

Further to this embodiment, coordinates for a region surrounding the region of interest are received from the first computer at the second computer. Encoded image data for a first frame for the region surrounding the region of interest is received, where receipt of the encoded image data for the first frame for the region surrounding the region of interest is effected after receipt of encoded image data for both of the first and second frames for the region of interest. The encoded image data for the first frame for the region surrounding the region of interest is decoded and displayed at a position corresponding to the received coordinates for the region surrounding the region of interest.

In more detail, the receiving computer 200 begins the reception process with step 601, where the receiving computer 200 establishes a connection with the transmitting computer 100 via network 1000. For example, a network connection may be established using either a connection-oriented protocol, such as the Transmission Control Protocol (TCP), or a connectionless-oriented protocol, e.g., the User Datagram Protocol (UDP). The connection may be established by the receiving computer 200 or by the transmitting computer 100.

In step 602, the data receiving module 316 of receiving computer 200 receives moving image information, including the block quality scale map, information about the structure of the compressed data and the compression options used during encoding, block prediction information to be used for reconstructing image data, and information about the complete video sequence. This information is used to recreate a moving image, as discussed more fully below.

For example, the receiving computer 200 may use information about the complete video sequence to allocate memory space for the incoming image data, or to determine how much screen space to allocate in order to display the incoming image data. The block quality scale map is used to restore image quality to image data, as discussed more fully in step 605. In addition, information about the structure of the compressed data and the compression options used during encoding is used to decode image data, and to restore the moving image.

In steps 603 to 606, image data for multiple frames of a moving image is received over a network from the transmitting computer 100 at the receiving computer 200. Coordinates for a region of interest are received. Encoded image data for a first frame for the region of interest is received. The encoded mage data for the first frame for the region of interest is decoded. The image data for the first frame for the region of interest is displayed at a position corresponding to the received coordinates for the region of interest.

In one example embodiment described herein, the region of interest is identified by the transmitting computer 100 by calculations using the image data.

In another example embodiment described herein, the region of interest and the region surrounding the region of interest are comprised of blocks of pixels, where the steps of receiving, decoding, and displaying are performed on the blocks of pixels.

In step 603, coordinates for the region of interest are received from the transmitting computer 100 at the receiving computer 200.

The data receiving module 316 of receiving computer 200 receives the coordinates for a block of pixels located within the first frame for the region of interest. As an example, the received coordinates may be x, y coordinates, where such coordinates respectively correspond to the horizontal and vertical addresses of the block of pixels being received, with respect to the original frame. Accordingly, the receiving computer 200 uses the x, y coordinates to plot the block of pixels on the display screen 201.

In step 604, encoded image data for a first frame for the region of interest is received.

In particular, the data receiving module 316 of receiving computer 200 receives the compressed bitstream for a block of pixels located within the first frame for the region of interest for which coordinates were received in step 603.

In one example embodiment described herein, the blocks of pixels are received in an order starting from the center of the region of interest and spiraling outwardly toward the edges of the region of interest.

The present disclosure also contemplates a different ordering for receipt of the coordinates and the receipt of the encoded image data, and the present embodiments can be adapted to receive the coordinates and the encoded image data in either order.

Thus, in one example embodiment, the image data and the coordinates corresponding to the encoded image data are received as a data packet and the data packet is unpackaged to retrieve the encoded image data and the coordinates corresponding to the encoded image data, where the steps of receiving the encoded image data and the coordinates corresponding to the image data are comprised by receiving the data packet.

In step 605, encoded image data for the first frame for the region of interest is decoded.

In particular, the compressed bitstream for the block of pixels for the first frame is decoded by decoding module 317 of receiving computer 200. After decoding the compressed bitstream, the receiving computer 200 uses the moving image information received in step 602, including the block quality scale map and block prediction information, to reconstruct the image data for the frame.

In more detail, the decoded bitstream yields quantized coefficients, which are re-scaled using inverse quantization. During the inverse quantization process, each coefficient is multiplied by an integer value to restore the coefficient to its original scale. In this regard, each coefficient is multiplied by its corresponding quantization parameter, which is determined according to the block quality scale map that was received in step 602.

An inverse discrete cosine transform (IDCT) is performed on each coefficient. The IDCT process produces an image block for the coefficients by weighing each basis pattern against each re-scaled coefficient value, and by combining the weighted basis patterns to form a residual. Further, for each block of pixels, the decoding process produces a prediction value that is identical to the prediction value created by the encoding process. This prediction value is added to the decoded residual to reconstruct a decoded block of pixels, which can then be displayed by the display module 318 of receiving computer 200.

The decoding process is performed for each Y', $C_B$ and $C_R$ color plane. As a result of these operations, a decoded block of pixels for the region of interest is produced for each Y', $C_B$ and $C_R$ color plane. Accordingly, the decoding module 317 of receiving computer 200 performs additional operations to convert the decoded block of pixels for each Y', $C_B$ and $C_R$ color plane back to the RGB color space before the displaying step.

In step 606, the image data for the first frame for the region of interest is displayed by display module 318 of receiving computer 200 at a position corresponding to the received coordinates for the region of interest. More specifically, the display module 318 of receiving computer 200 plots the decoded block of pixels for the first frame at a position corresponding to the coordinates for the region of interest.

In step 607, the data receiving module 316 of receiving computer 200 determines if further data for the compressed bitstream remains to be received. In particular, the data receiving module 316 of receiving computer 200 determines if additional blocks of pixels for the first frame for the region of interest remain to be received. If additional blocks of pixels for the first frame for the region of interest still remain to be received, the receiving computer 200 proceeds to step 603, and receives coordinates and image data for the next block of pixels located within the first frame for the region of interest, as described above. Otherwise, the receiving computer 200 continues to step 608.

In step 608, the data receiving module 316 of receiving computer 200 determines if image data for a second frame subsequent in time to the first frame for the region of interest is to be received, decoded, and displayed. If image data for a second frame subsequent in time to the first frame for the region of interest remains to be received, decoded, and displayed, the receiving computer 200 proceeds to step 603. In this regard, encoded image data for a second frame subsequent in time to the first frame for the region of interest is received and decoded. Further, the encoded image data for the second frame for the region of interest is displayed at a position corresponding to the received coordinates for the region of interest. If no additional frames remain, the receiving computer 200 continues to step 609.

According to the example embodiment described herein, the steps of receiving coordinates for a region of interest; receiving encoded image data for a first frame for the region of interest; decoding the encoded image data for the first frame for the region of interest; displaying the image data for the first frame for the region of interest at a position corresponding to the received coordinates for the region of interest; receiving encoded image data for a second frame subsequent in time to the first frame for the region of interest; decoding the encoded image data for the second frame for the region of interest; displaying the image data for the second frame for the region of interest at a position corresponding to the received coordinates for the region of interest; are repeated for each subsequent frame until encoded image data for the region of interest is received for an entirety of the moving image.

Further to this embodiment, the steps of receiving coordinates for a region surrounding the region of interest; receiving encoded image data for a first frame for the region surrounding the region of interest; decoding the encoded image data for the first frame for the region surrounding the region of interest; and displaying the image data for the first frame for the region surrounding the region of interest at a position corresponding to the received coordinates for the region surrounding the region of interest; are repeated for each subsequent frame until encoded image data for the region surrounding the region of interest is received, for an entirety of the moving image Thus, in step 609, coordinates for the region surrounding the region of interest are received from the transmitting computer 100 at the receiving computer 200.

The data receiving module 316 of receiving computer 200 receives the coordinates for a block of pixels located within the first frame for the region surrounding the region of interest. As an example, the received coordinates may be x, y coordinates, where such coordinates respectively correspond to the horizontal and vertical addresses of the block of pixels being received, with respect to the original frame. Accordingly, display module 318 of receiving computer 200 uses the x, y coordinates to plot the block of pixels on the display screen 201.

In step 610, encoded image data for a first frame for the region surrounding the region of interest is received.

In more detail, the data receiving module 316 of receiving computer 200 receives the compressed bitstream for a block of pixels located within the first frame for the region surrounding the region of interest, for which coordinates were received in step 609.

In one example embodiment described herein, the blocks of pixels are received in an order starting from the center of the region of interest and spiraling outwardly toward the edges of the region of interest.

The present disclosure also contemplates a different ordering for receipt of the coordinates and receipt of the encoded image data, and the present embodiments can be adapted to receive the coordinates and the encoded image data in either order.

Thus, in one example embodiment, the image data and the coordinates corresponding to the encoded image data are received as a data packet and the data packet is unpackaged to retrieve the encoded image data and the coordinates corresponding to the encoded image data, where the steps of receiving the encoded image data and the coordinates corresponding to the image data are comprised by receiving the data packet.

In step 611, encoded image data for the first frame for the region surrounding the region of interest is decoded. In particular, the compressed bitstream for the block of pixels for the first frame is decoded using the same procedure that was described in step 605.

In step 612, image data for the first frame for the region surrounding the region of interest is displayed at a position corresponding to the received coordinates for the region surrounding the region of interest. More specifically, the display module 318 of receiving computer 200 plots the decoded block of pixels for the first frame at a position corresponding to the coordinates for the region surrounding the region of interest.

In step 613, the data receiving module 316 of receiving computer 200 determines if further data for the compressed bitstream remains to be received. In particular, data receiving module 316 of receiving computer 200 determines if additional blocks of pixels for the first frame for the region surrounding the region of interest remain to be received. If additional blocks of pixels for the first frame for the region surrounding the region of interest still remain to be received, receiving computer 200 proceeds to step 609, and receives coordinates and image data for the next block of pixels located within the first frame for the region surrounding the region of interest, as described above. Otherwise, the receiving computer 200 continues to step 614.

In one example embodiment described herein, after transmission of encoded image data for the first frame for the region surrounding the region of interest, the receiving computer 200 receives, decodes, and displays image data for a second frame subsequent in time to the first frame for the region surrounding the region of interest at a position corresponding to the received coordinates for the region surrounding the region of interest.

Thus, in step 614, the data receiving module 316 of receiving computer 200 determines if image data for a second frame subsequent in time to the first frame for the region surrounding the region of interest remains to be received, decoded, and displayed. If image data for a second frame subsequent in time to the first frame for the region surrounding the region of interest still remains to be received, decoded, and displayed, the receiving computer 200 proceeds to step 609, and receives coordinates for a second frame subsequent in time to the first frame for the region surrounding the region of interest, as described above. Otherwise, the receiving computer 200 ends the reception process.

According to the example embodiment described herein, the steps of receiving coordinates for a region of interest; receiving encoded image data for a first frame for the region of interest; decoding the encoded image data for the first frame for the region of interest; displaying the image data for the first frame for the region of interest at a position corresponding to the received coordinates for the region of interest; receiving encoded image data for a second frame subsequent in time to the first frame for the region of interest; decoding the encoded image data for the second frame for the region of interest; displaying the image data for the second frame for the region of interest at a position corresponding to the received coordinates for the region of interest; are repeated for each subsequent frame until encoded image data for the region of interest is received for an entirety of the moving image.

Further to this embodiment, the steps of receiving coordinates for a region surrounding the region of interest; receiving encoded image data for a first frame for the region surrounding the region of interest; decoding the encoded image data for the first frame for the region surrounding the region of interest; and displaying the image data for the first frame for the region surrounding the region of interest at a position corresponding to the received coordinates for the region surrounding the region of interest; are repeated for each subsequent frame until encoded image data for the region surrounding the region of interest is received, for an entirety of the moving image.

FIG. 7 is a view for explaining an example transmission order for image data where the image data is comprised of blocks of pixels.

FIG. 7 depicts the region of interest and the region surrounding the region of interest as being comprised of blocks of pixels, as indicated by the numbered boxes. In this regard, the region of interest 701, as depicted by the shaded area, is transmitted in an order starting from the center of the region of interest, i.e., ROI center, and spiraling outwardly toward the edges of the frame.

In this example, the blocks of pixels are transmitted in groups, strip by strip, beginning with the block of pixels labeled "ROI center." The unshaded strip of blocks labeled "1" is encoded and transmitted next. Further, the strip of blocks labeled "2" is then transmitted. This ordering of transmission continues outwardly in a spiraling direction, up to the strip of blocks labeled "4".

Upon transmission of the region of interest 701, the region surrounding the region of interest 702 is transmitted in a similar fashion, beginning with the strip of blocks labeled "5", followed by the strip of blocks labeled "6", and proceeding outwardly in a spiraling direction, up to the strip of blocks labeled "12".

FIG. 8A illustrates a virtual frame that has been established for a frame in a moving image.

FIG. 8A depicts a region of interest 801a that was identified by calculations performed by the identification module 218 of transmitting computer 100. In addition, a virtual frame 802a is also shown. Image data contained within the virtual frame is given encoding and transmission priority, as discussed earlier. Virtual frame 802a signifies the minimum amount of information that is encoded and transmitted from the transmitting computer 100 to the receiving computer 200 during the transmission process. The image data located outside of the virtual frame 802a is transmitted after transmission of the region of interest and the virtual frame image data. An outer frame 803a is also shown. The outer frame 803a is used to perform intercoding operations, such as motion estimation, for the virtual frame.

Figure 8B:
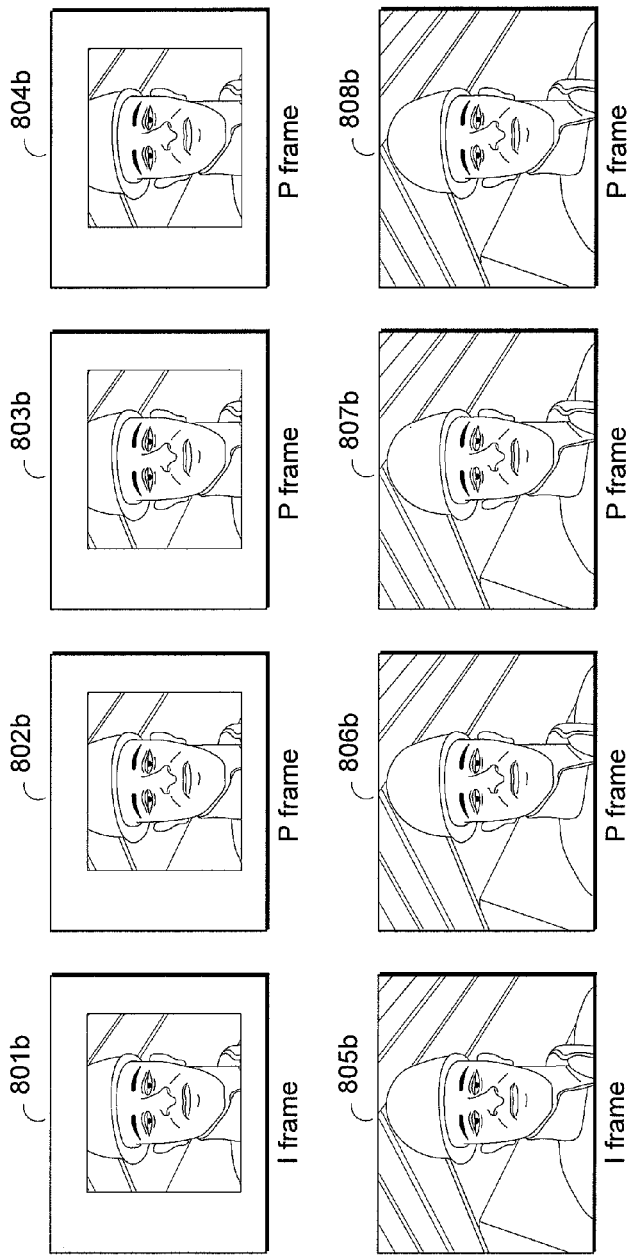
FIG. 8B illustrates an example execution of the transmission operation using a group of pictures for a moving image containing a region of interest.

FIG. 8B illustrates an example execution of the transmission operation using a group of pictures for a moving image containing a region of interest.

Image data for multiple frames of a moving image is transmitted from the transmitting computer 100 to the receiving computer 200 over a network. A region of interest for all of the multiple frames in the moving image is identified by the identification module 218 of transmitting computer 100, where the identification module 218 identifies the region of interest by calculations using the image data for at least some of the multiple frames.

According to this example embodiment, each group of pictures consists of one intracoded frame, followed by three intercoded predicted frames. Therefore, each group of pictures contains four frames, where the four frames have an IPPP frame structure.

Thus, in step 801b, image data for a first frame for the region of interest is encoded. Coordinates for the region of interest are transmitted from the transmitting computer 100 to the receiving computer 200. Encoded image data for a first frame for the region of interest is transmitted to the receiving computer 200 for display by the receiving computer 200 at a position corresponding to the transmitted coordinates for the region of interest.

In step 802b, image data for a second frame subsequent in time to the first frame for the region of interest is encoded and transmitted to the receiving computer 200 for display by the receiving computer 200 at a position corresponding to the transmitted coordinates for the region of interest.

According to one example embodiment described herein, the steps of identifying a region of interest; encoding image data for a first frame for the region of interest; transmitting coordinates for the region of interest; transmitting the encoded image data for the first frame for the region of interest; encoding image data for a second frame subsequent in time to the first frame for the region of interest; transmitting encoded image data for the second frame for the region of interest; are repeated for each subsequent frame until encoded image data for the region of interest is transmitted for an entirety of the moving image.

Thus, in step 803b image data for a first frame for the region of interest is encoded. Coordinates for the region of interest are transmitted from the transmitting computer 100 to the receiving computer 200. Image data for a first frame for the region of interest is transmitted to the receiving computer 200 for display.

In step 804b, image data for a second frame subsequent in time to the first frame for the region of interest is encoded and transmitted to the receiving computer 200 for display.

In step 805b, a region surrounding the region of interest is identified by the transmitting computer 100. Image data for the first frame for the region surrounding the region of interest is encoded. Coordinates for the region surrounding the region of interest are transmitted from the transmitting computer 100 to the receiving computer 200. Encoded image data for the first frame for the region surrounding the region of interest is transmitted to the receiving computer 200 for display by the receiving computer 200 at a position corresponding to the transmitted coordinates for the region surrounding the region of interest, where transmission of the encoded image data for the first frame for the region surrounding the region of interest is effected after transmission of encoded image data for both of the first and second frames for the region of interest.

In particular, image data for the region surrounding the region of interest is transmitted and displayed after all image data for the region of interest has been displayed.

In step 806b, after transmission of encoded image data for the first frame for the region surrounding the region of interest, the transmitting computer 100 encodes and transmits image data for a second frame subsequent in time to the first frame for the region surrounding the region of interest to the receiving computer 200 for decoding and display by the receiving computer 200 at a position corresponding to the transmitted coordinates for the region surrounding the region of interest.

According to the example embodiment described herein, the steps of identifying a region surrounding the region of interest by the transmitting computer 100, encoding image data for the first frame for the region surrounding the region of interest, transmitting coordinates for the region surrounding the region of interest, and transmitting the encoded image data for the first frame for the region surrounding the region of interest, are repeated for each subsequent frame until encoded image data for the region surrounding the region of interest is transmitted, for an entirety of the moving image.

Thus, in step 807b, image data for the first frame for the region surrounding the region of interest is encoded. Coordinates for the region surrounding the region of interest are transmitted from the transmitting computer 100 to the receiving computer 200. Encoded image data for the first frame for the region surrounding the region of interest is transmitted to the receiving computer 200 for display.

In step 808b, after transmission of encoded image data for the first frame for the region surrounding the region of interest, the transmitting computer 100 encodes and transmits image data for a second frame subsequent in time to the first frame for the region surrounding the region of interest to the receiving computer 200 for decoding and display.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for transmitting image data for multiple frames of a moving image from a first computer to a second computer over a network, wherein the method comprises:

identifying a region of interest for all of the multiple frames in the moving image by the first computer, wherein the first computer identifies the region of interest by calculations using the image data for at least some of the multiple frames;

encoding image data for a first frame for the region of interest;

transmitting coordinates for the region of interest from the first computer to the second computer;

transmitting the encoded image data for the first frame for the region of interest from the first computer to the second computer for decoding and display by the second computer at a position corresponding to the transmitted coordinates for the region of interest;

encoding image data for a second frame subsequent in time to the first frame for the region of interest;

transmitting the encoded image data for the second frame for the region of interest from the first computer to the second computer for decoding and display by the second computer at a position corresponding to the transmitted coordinates for the region of interest;

identifying a region surrounding the region of interest by the first computer;

encoding image data for the first frame for the region surrounding the region of interest;

transmitting coordinates for the region surrounding the region of interest from the first computer to the second computer; and transmitting the encoded image data for the first frame for the region surrounding the region of interest from the first computer to the second computer for decoding and display by the second computer at a position corresponding to the transmitted coordinates for the region surrounding the region of interest, wherein transmission of the encoded image data for the first frame for the region surrounding the region of interest is effected after transmission of encoded image data for both of the first frame for the region of interest and the second frame for the region of interest.

2. A method according to claim 1, further comprising a repetition of the steps of identifying a region of interest; encoding image data for a first frame for the region of interest; transmitting coordinates for the region of interest; transmitting the encoded image data for the first frame for the region of interest; encoding image data for a second frame subsequent in time to the first frame for the region of interest; transmitting the encoded image data for the second frame for the region of interest, for each subsequent frame until encoded image data for the region of interest is transmitted for an entirety of the moving image, and further comprising a repetition of the steps of identifying a region surrounding the region of interest by the first computer; encoding image data for the first frame for the region surrounding the region of interest; transmitting coordinates for the region surrounding the region of interest; and transmitting the encoded image data for the first frame for the region surrounding the region of interest, for each subsequent frame until encoded image data for the region surrounding the region of interest is transmitted, for an entirety of the moving image.

3. A method according to claim 1, wherein the encoding of the region of interest and the region surrounding the region of interest is adjusted in quality depending on limitations imposed by a user or the network.

4. A method according to claim 1, wherein the image quality of the image data is scaled for each region surrounding the region of interest based on the distance between the region and the region of interest.

5. A method according to claim 1, wherein the image data is encoded to produce a lossless transmission.

6. A method according to claim 1, wherein the image data is encoded to produce a lossy transmission.

7. A method according to claim 1, further comprising packaging of the encoded image data and the coordinates corresponding to the encoded image data into a data packet, one after the other, wherein the steps of transmitting coordinates and transmitting the encoded image data are comprised by transmitting the data packet.

8. A method according to claim 1, wherein the identification of the region of interest uses edge detection calculations on the image data for the some of the multiple frames.

9. A method according to claim 1, wherein the identification of the region of interest uses spatial frequency calculations on the image data for the some of the multiple frames.

10. A method according to claim 1, wherein the identification of the region of interest uses face detection calculations on the image data for the some of the multiple frames.

11. A method according to claim 1, wherein the identification of the region of interest incorporates machine learning techniques, wherein the machine learning techniques analyze samples of image data for the some of the multiple frames, and wherein the region of interest is identified based on patterns uncovered from analyzing the samples.

12. A method according to claim 1, wherein the identification of the region of interest incorporates data mining techniques, wherein the data mining techniques analyze samples of image data for the some of the multiple frames, and wherein the region of interest is identified based on patterns uncovered from analyzing the samples.

13. A method according to claim 1, wherein the identification of the region of interest uses metadata for the image data for the some of the multiple frames, wherein the metadata for the image data provides image content information for the image data, and wherein the region of interest is identified based on the image content information.

14. A method according to claim 1, wherein the identification of the region of interest uses block recognition techniques on the image data for the some of the multiple frames.

15. A method according to claim 1, wherein the encoding of image data for one or both of the region of interest and the regions other than the region of interest is performed in successive passes of increasing visual quality.

16. A method according to claim 1, wherein the region of interest and the region surrounding the region of interest are comprised of blocks of pixels, and wherein the steps of encoding and transmitting are performed on the blocks of pixels.

17. A method according to claim 16, wherein the blocks of pixels are transmitted in an order starting from the center of the region of interest and spiraling outwardly toward the edges of the region of interest.

18. A method according to claim 1, wherein, after transmission of encoded image data for the first frame for the region surrounding the region of interest, the first computer encodes and transmits image data for a second frame subsequent in time to the first frame for the region surrounding the region of interest to the second computer for decoding and display by the second computer at a position corresponding to the transmitted coordinates for the region surrounding the region of interest.

19. An image processing apparatus, comprising:
a computer-readable memory constructed to store computer-executable process steps; and
a processor constructed to execute the computer-executable process steps stored in the memory;
wherein the process steps stored in the memory cause the processor to transmit image data for multiple frames of a moving image from a first computer to a second computer over a network, and wherein the process steps include computer-executable process steps to:
identify a region of interest for all of the multiple frames in the moving image by the first computer, wherein the first computer identifies the region of interest by calculations using the image data for at least some of the multiple frames;
transmit coordinates for the region of interest from the first computer to the second computer;
encode image data for a first frame for the region of interest;
transmit the encoded image data for the first frame for the region of interest from the first computer to the second computer for decoding and display by the second computer at a position corresponding to the transmitted coordinates for the region of interest;
encode image data for a second frame subsequent in time to the first frame for the region of interest;
transmit the encoded image data for the second frame for the region of interest from the first computer to the second computer for decoding and display by the second computer at a position corresponding to the transmitted coordinates for the region of interest;
identify a region surrounding the region of interest by the first computer;
transmit coordinates for the region surrounding the region of interest from the first computer to the second computer;
encode image data for the first frame for the region surrounding the region of interest; and
transmit the encoded image data for the first frame for the region surrounding the region of interest from the first computer to the second computer for decoding and display by the second computer at a position corresponding to the transmitted coordinates for the region surrounding the region of interest, wherein transmission of the encoded image data for the first frame for the region surrounding the region of interest is effected after transmission of encoded image data for both of the first frame for the region of interest and the second frame for the region of interest.

20. An apparatus according to claim 19, further comprising a repetition of the steps of identifying a region of interest; encoding image data for a first frame for the region of interest; transmitting coordinates for the region of interest; transmitting the encoded image data for the first frame for the region of interest; encoding image data for a second frame subsequent in time to the first frame for the region of interest; transmitting the encoded image data for the second frame for the region of interest, for each subsequent frame until encoded image data for the region of interest is transmitted for an entirety of the moving image, and further comprising a repetition of the steps of identifying a region surrounding the region of interest by the first computer; encoding image data for the first frame for the region surrounding the region of interest; transmitting coordinates for the region surrounding the region of interest; and transmitting the encoded image data for the first frame for the region surrounding the region of interest, for each subsequent frame until encoded image data for the region surrounding the region of interest is transmitted, for an entirety of the moving image.

21. An apparatus according to claim 19, wherein the encoding of the region of interest and the region surrounding the region of interest is adjusted in quality depending on limitations imposed by a user or the network.

22. An apparatus according to claim 19, wherein the image quality of the image data is scaled for each region surrounding the region of interest based on the distance between the region and the region of interest.

23. An apparatus according to claim 19, wherein the image data is encoded to produce a lossless transmission.

24. An apparatus according to claim 19, wherein the image data is encoded to produce a lossy transmission.

25. An apparatus according to claim 19, further comprising packaging of the encoded image data and the coordinates corresponding to the encoded image data into a data packet, one after the other, wherein the steps of transmitting coordinates and transmitting the encoded image data are comprised by transmitting the data packet.

26. An apparatus according to claim 19, wherein the identification of the region of interest uses edge detection calculations on the image data for the some of the multiple frames.

27. An apparatus according to claim 19, wherein the identification of the region of interest uses spatial frequency calculations on the image data for the some of the multiple frames.

28. An apparatus according to claim 19, wherein the identification of the region of interest uses face detection calculations on the image data for the some of the multiple frames.

29. An apparatus according to claim 19, wherein the identification of the region of interest incorporates machine learning techniques, wherein the machine learning techniques analyze samples of image data for the some of the multiple frames, and wherein the region of interest is identified based on patterns uncovered from analyzing the samples.

30. An apparatus according to claim 19, wherein the identification of the region of interest incorporates data mining techniques, wherein the data mining techniques analyze samples of image data for the some of the multiple frames, and wherein the region of interest is identified based on patterns uncovered from analyzing the samples.

31. An apparatus according to claim 19, wherein the identification of the region of interest uses metadata for the image data for the some of the multiple frames, wherein the metadata for the image data provides image content information for the image data, and wherein the region of interest is identified based on the image content information.

32. An apparatus according to claim 19, wherein the identification of the region of interest uses block recognition techniques on the image data for the some of the multiple frames.

33. An apparatus according to claim 19, wherein the encoding of image data for one or both of the region of interest and the regions other than the region of interest is performed in successive passes of increasing visual quality.

34. An apparatus according to claim 19, wherein the region of interest and the region surrounding the region of interest are comprised of blocks of pixels, and wherein the steps of encoding and transmitting are performed on the blocks of pixels.

35. An apparatus according to claim 34, wherein the blocks of pixels are transmitted in an order starting from the center of the region of interest and spiraling outwardly toward the edges of the region of interest.

36. An apparatus according to claim 19, wherein, after transmission of encoded image data for the first frame for the region surrounding the region of interest, the first computer encodes and transmits image data for a second frame subsequent in time to the first frame for the region surrounding the region of interest to the second computer for decoding and display by the second computer at a position corresponding to the transmitted coordinates for the region surrounding the region of interest.

37. A non-transitory computer-readable storage medium storing a computer-executable program for causing a computer to perform a method for transmitting image data for multiple frames of a moving image from a first computer to a second computer over a network, the method comprising:
 identifying a region of interest for all of the multiple frames in the moving image by the first computer, wherein the first computer identifies the region of interest by calculations using the image data for at least some of the multiple frames;
 transmitting coordinates for the region of interest from the first computer to the second computer;
 encoding image data for a first frame for the region of interest;
 transmitting the encoded image data for the first frame for the region of interest from the first computer to the second computer for decoding and display by the second computer at a position corresponding to the transmitted coordinates for the region of interest;
 encoding image data for a second frame subsequent in time to the first frame for the region of interest;
 transmitting the encoded image data for the second frame for the region of interest from the first computer to the second computer for decoding and display by the second computer at a position corresponding to the transmitted coordinates for the region of interest;
 identifying a region surrounding the region of interest by the first computer;
 transmitting coordinates for the region surrounding the region of interest from the first computer to the second computer;
 encoding image data for the first frame for the region surrounding the region of interest; and
 transmitting the encoded image data for the first frame for the region surrounding the region of interest from the first computer to the second computer for decoding and display by the second computer at a position corresponding to the transmitted coordinates for the region surrounding the region of interest, wherein transmission of the encoded image data for the first frame for the region surrounding the region of interest is effected after transmission of encoded image data for both of the first frame for the region of interest and the second frame for the region of interest.

38. An image processing module for transmitting image data for multiple frames of a moving image from a first computer to a second computer over a network, the image processing module being non-transitory and comprising:
 an identification module constructed to identify a region of interest for all of the multiple frames in the moving image by the first computer, wherein the first computer identifies the region of interest by calculations using the image data for at least some of the multiple frames, and wherein the identification module is further constructed to identify a region surrounding the region of interest by the first computer;
 a data transmitting module constructed to transmit coordinates for the region of interest from the first computer to the second computer, and wherein the data transmitting module is further constructed to transmit coordinates for the region surrounding the region of interest from the first computer to the second computer;
 an encoding module constructed to encode image data for a first frame for the region of interest, wherein the encoding module is further constructed to encode image data for a second frame subsequent in time to the first frame for the region of interest, and to encode image data for a first frame for the region surrounding the region of interest;

wherein the data transmitting module is further constructed to transmit the encoded image data for the first frame for the region of interest from the first computer to the second computer for decoding and display by the second computer at a position corresponding to the transmitted coordinates for the region of interest, to transmit the encoded image data for the second frame for the region of interest from the first computer to the second computer for decoding and display by the second computer at a position corresponding to the transmitted coordinates for the region of interest, and to transmit the encoded image data for the first frame for the region surrounding the region of interest from the first computer to the second computer for decoding and display by the second computer at a position corresponding to the transmitted coordinates for the region surrounding the region of interest, wherein transmission of the encoded image data for the first frame for the region surrounding the region of interest is effected after transmission of encoded image data for both of the first frame for the region of interest and the second frame for the region of interest.

39. A method for receiving image data for multiple frames of a moving image from a first computer at a second computer over a network, wherein the method comprises:

receive coordinates for a region of interest from the first computer at the second computer;

receiving encoded image data for a first frame for the region of interest;

decoding the encoded image data for the first frame for the region of interest;

displaying the image data for the first frame for the region of interest at a position corresponding to the received coordinates for the region of interest;

receiving encoded image data for a second frame subsequent in time to the first frame for the region of interest;

decoding the encoded image data for the second frame for the region of interest;

displaying the image data for the second frame for the region of interest at a position corresponding to the received coordinates for the region of interest;

receiving coordinates for a region surrounding the region of interest from the first computer at the second computer;

receiving encoded image data for a first frame for the region surrounding the region of interest, wherein receipt of the encoded image data for the first frame for the region surrounding the region of interest is effected after receipt of encoded image data for both of the first frame for the region of interest and the second frame for the region of interest;

decoding the encoded image data for the first frame for the region surrounding the region of interest; and displaying the image data for the first frame for the region surrounding the region of interest at a position corresponding to the received coordinates for the region surrounding the region of interest.

40. A method according to claim 39, further comprising a repetition of the steps of receiving coordinates for a region of interest; receiving encoded image data for a first frame for the region of interest; decoding the encoded image data for the first frame for the region of interest; displaying the image data for the first frame for the region of interest at a position corresponding to the received coordinates for the region of interest; receiving encoded image data for a second frame subsequent in time to the first frame for the region of interest; decoding the encoded image data for the second frame for the region of interest; displaying the image data for the second frame for the region of interest at a position corresponding to the received coordinates for the region of interest, for each subsequent frame until encoded image data for the region of interest is received for an entirety of the moving image, and further comprising a repetition of the steps of receiving coordinates for a region surrounding the region of interest; receiving encoded image data for a first frame for the region surrounding the region of interest; decoding the encoded image data for the first frame for the region surrounding the region of interest; and displaying the image data for the first frame for the region surrounding the region of interest at a position corresponding to the received coordinates for the region surrounding the region of interest, for each subsequent frame until encoded image data for the region surrounding the region of interest is received, for an entirety of the moving image.

41. A method according to claim 39, further comprising receiving the encoded image data and the coordinates corresponding to the encoded image data as a data packet and unpackaging the data packet to retrieve the encoded image data and the coordinates corresponding to the encoded image data, wherein the steps of receiving the encoded image data and the coordinates corresponding to the encoded image data are comprised by receiving the data packet.

42. A method according to claim 39, wherein the region of interest and the region surrounding the region of interest are comprised of blocks of pixels, and wherein the steps of receiving, decoding, and displaying are performed on the blocks of pixels.

43. A method according to claim 42, wherein the blocks of pixels are received in an order starting from the center of the region of interest and spiraling outwardly toward the edges of the region of interest.

44. A method according to claim 39, wherein the region of interest is identified by the first computer by calculations using the image data.

45. A method according to claim 39, wherein, after receipt of encoded image data for the first frame for the region surrounding the region of interest, the second computer receives, decodes, and displays image data for a second frame subsequent in time to the first frame for the region surrounding the region of interest at a position corresponding to the received coordinates for the region surrounding the region of interest.

46. An image processing apparatus, comprising:

a computer-readable memory constructed to store computer-executable process steps; and a processor constructed to execute the computer-executable process steps stored in the memory;

wherein the process steps stored in the memory cause the processor to receive image data for multiple frames of a moving image from a first computer at a second computer over a network, and wherein the process steps include computer-executable process steps to:

receive coordinates for a region of interest from the first computer at the second computer;

receive encoded image data for a first frame for the region of interest at the second computer for decoding and display by the second computer at a position corresponding to the received coordinates for the region of interest;

decode the image data for the first frame for the region of interest;

display the image data for the first frame for the region of interest at a position corresponding to the received coordinates for the region of interest;

receive encoded image data for a second frame subsequent in time to the first frame for the region of interest;

decode the image data for the second frame for the region of interest;

display the image data for the second frame for the region of interest at a position corresponding to the received coordinates for the region of interest;

receive coordinates for a region surrounding the region of interest from the first computer at the second computer;

receive the image data for a first frame for the region surrounding the region of interest at the second computer for decoding and display by the second computer at a position corresponding to the received coordinates for the region of interest, wherein receipt of the encoded image data for the first frame for the region surrounding the region of interest is effected after receipt of encoded image data for both of the first frame for the region of interest and the second frame for the region of interest;

decode the image data for the first frame for the region surrounding the region of interest; and display the image data for the first frame for the region surrounding the region of interest at a position corresponding to the received coordinates for the region surrounding the region of interest.

47. An apparatus according to claim 46, further comprising a repetition of the steps of receiving coordinates for a region of interest; receiving encoded image data for a first frame for the region of interest; decoding the encoded image data for the first frame for the region of interest; displaying the image data for the first frame for the region of interest at a position corresponding to the received coordinates for the region of interest; receiving encoded image data for a second frame subsequent in time to the first frame for the region of interest; decoding the encoded image data for the second frame for the region of interest; displaying the image data for the second frame for the region of interest at a position corresponding to the received coordinates for the region of interest, for each subsequent frame until encoded image data for the region of interest is received for an entirety of the moving image, and further comprising a repetition of the steps of receiving coordinates for a region surrounding the region of interest; receiving encoded image data for a first frame for the region surrounding the region of interest; decoding the encoded image data for the first frame for the region surrounding the region of interest; and displaying the image data for the first frame for the region surrounding the region of interest at a position corresponding to the received coordinates for the region surrounding the region of interest, for each subsequent frame until encoded image data for the region surrounding the region of interest is received, for an entirety of the moving image.

48. An apparatus according to claim 46, further comprising receiving the encoded image data and the coordinates corresponding to the encoded image data as a data packet and unpackaging the data packet to retrieve the encoded image data and the coordinates corresponding to the encoded image data, wherein the steps of receiving the encoded image data and the coordinates corresponding to the encoded image data are comprised by receiving the data packet.

49. An apparatus according to claim 46, wherein the region of interest and the region surrounding the region of interest are comprised of blocks of pixels, and wherein the steps of receiving, decoding, and displaying are performed on the blocks of pixels.

50. An apparatus according to claim 49, wherein the blocks of pixels are received in an order starting from the center of the region of interest and spiraling outwardly toward the edges of the region of interest.

51. An apparatus according to claim 46, wherein the region of interest is identified by the first computer by calculations using the image data.

52. An apparatus according to claim 46, wherein, after receipt of encoded image data for the first frame for the region surrounding the region of interest, the second computer receives, decodes, and displays image data for a second frame subsequent in time to the first frame for the region surrounding the region of interest at a position corresponding to the received coordinates for the region surrounding the region of interest.

53. A non-transitory computer-readable storage medium storing a computer-executable program for causing a computer to perform a method for receiving image data of an image from a first computer at a second computer over a network, the method comprising:

receiving coordinates for a region of interest from the first computer at the second computer;

receiving encoded image data for a first frame for the region of interest at the second computer for display by the second computer at a position corresponding to the received coordinates for the region of interest;

decoding the encoded image data for the first frame for the region of interest;

displaying the image data for the first frame for the region of interest at a position corresponding to the received coordinates for the region of interest;

receiving encoded image data for a second frame subsequent in time to the first frame for the region of interest;

decoding the encoded image data for the second frame for the region of interest;

displaying the image data for the second frame for the region of interest at a position corresponding to the received coordinates for the region of interest;

receiving coordinates for a region surrounding the region of interest from the first computer at the second computer;

receiving encoded image data for a first frame for the region surrounding the region of interest at the second computer for display by the second computer at a position corresponding to the transmitted coordinates for the region of interest, wherein receipt of the encoded image data for the first frame for the region surrounding the region of interest is effected after receipt of encoded image data for both of the first frame for the region of interest and the second frame for the region of interest;

decoding the encoded image data for the first frame for the region surrounding the region of interest; and displaying the image data for the first frame for the region surrounding the region of interest at a position corresponding to the received coordinates for the region surrounding the region of interest.

54. An image processing module for receiving image data for multiple frames of a moving image from a first computer at a second computer over a network, the image processing module being non-transitory and comprising:

a data receiving module that is constructed to receive coordinates for a region of interest from the first computer at the second computer, wherein the data receiving module is further constructed to receive encoded image data for a first frame for the region of interest at the second computer for display by the second computer at a position corresponding to the received coordinates for the region of interest, to receive encoded image data for a second frame subsequent in time to the first frame for the region of interest, to receive coordinates for a region surrounding the region of interest from the first computer at the second computer, and to receive encoded image data for a first frame for the region surrounding the region of interest at the second computer for display by the second computer at a position corresponding to the transmitted coordinates for the region of interest, wherein receipt of the encoded image data for the first frame for the region surrounding the region of interest is effected after receipt of encoded image data for both of the first frame for the region of interest and the second frame for the region of interest;

a decoding module for decoding the encoded image data for the first frame for the region of interest, wherein the decoding module is further constructed to decode the encoded image data for the second frame for the region of interest, and to decode the encoded image data for the first frame for the region surrounding the region of interest;

a display module for displaying the image data for the first frame for the region of interest at a position corresponding to the received coordinates for the region of interest, wherein the display module is further constructed to display image data for the second frame for the region of interest at a position corresponding to the received coordinates for the region of interest, and to display image data for the first frame for the region surrounding the region of interest at a position corresponding to the received coordinates for the region surrounding the region of interest.

* * * * *